(12) United States Patent
Kim

(10) Patent No.: US 12,585,930 B2
(45) Date of Patent: Mar. 24, 2026

(54) NPU FOR GENERATING FEATURE MAP BASED ON COEFFICIENTS AND METHOD THEREOF

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 945 days.

(21) Appl. No.: 17/848,372

(22) Filed: Jun. 23, 2022

(65) Prior Publication Data

US 2022/0327368 A1 Oct. 13, 2022

Related U.S. Application Data

(63) Continuation of application No. 17/498,766, filed on Oct. 12, 2021, now Pat. No. 11,416,737.

(30) Foreign Application Priority Data

Dec. 29, 2020 (KR) ........................ 10-2020-0186375

(51) Int. Cl.
  *G06N 3/063* (2023.01)
  *G06N 20/10* (2019.01)
(52) U.S. Cl.
  CPC ............. *G06N 3/063* (2013.01); *G06N 20/10* (2019.01)
(58) Field of Classification Search
  None
  See application file for complete search history.

(56) References Cited

U.S. PATENT DOCUMENTS

2015/0100530 A1* 4/2015 Mnih ....................... G06N 3/08
                                                    706/25
2020/0104690 A1 4/2020 Bai et al.
                    (Continued)

FOREIGN PATENT DOCUMENTS

EP        3674982 A1 * 7/2020 ............. G06N 3/045
KR  1020200076461 A   6/2020

OTHER PUBLICATIONS

Zhang et al., DYNET: Dynamic Convolution for Accelerating Convolutional Neural Networks, arXiv: 2004.10694v1 [cs.CV] Apr. 22, 2020; Total pp. 1-16 (Year: 2020).*

(Continued)

*Primary Examiner* — Alan Chen
(74) *Attorney, Agent, or Firm* — Bridgeway IP Law Group, PLLC; Jihun Kim

(57) ABSTRACT

A neural processing unit (NPU), a method for driving an artificial neural network (ANN) model, and an ANN driving apparatus are provided. The NPU includes a semiconductor circuit that includes at least one processing element (PE) configured to process an operation of an artificial neural network (ANN) model; and at least one memory configurable to store a first kernel and a first kernel filter. The NPU is configured to generate a first modulation kernel based on the first kernel and the first kernel filter and to generate second modulation kernel based on the first kernel and a second kernel filter generated by applying a mathematical function to the first kernel filter. Power consumption and memory read time are both reduced by decreasing the data size of a kernel read from a separate memory to an artificial neural network processor and/or by decreasing the number of memory read requests.

19 Claims, 25 Drawing Sheets

(56)  References Cited

U.S. PATENT DOCUMENTS

| | | |
|---|---|---|
| 2020/0160226 A1 | 5/2020 | Ross et al. |
| 2021/0064688 A1 | 3/2021 | Saeed et al. |
| 2022/0043630 A1 | 2/2022 | Kwon et al. |
| 2022/0066739 A1 | 3/2022 | Croxford et al. |

OTHER PUBLICATIONS

Cohen et al., Group Equivariant Convolutional Networks, arXiv:1602. 07576v1 [cs.LG] Feb. 24, 2016; Total p. 11 (Year: 2016).*
Cheng et al., A Survey of Model Compression and Acceleration for Deep Neural Networks, arXiv:1710.09282v9 [cs.LG] Jun. 14, 2020 (Year: 2020).*
K-H. Lee et al., "An Inter-Layer Weight Prediction and Quantization for Deep Neural Networks based on a Smoothly Varying Weight Hypothsis", arXiv:1907.06835v2., Aug. 20, 2020.

* cited by examiner

| Operation | Energy(pj) | Relative Energy Cost |
|-----------|-----------|----------------------|
| 8b Add | 0.03 | |
| 16b Add | 0.05 | |
| 32b Add | 0.1 | |
| 16b FP Add | 0.4 | |
| 32b FP Add | 0.9 | |
| 8b Mult | 0.2 | |
| 32b Mult | 3.1 | |
| 16b FP Mult | 1.1 | |
| 32b FP Mult | 3.7 | |
| 32b SRAM Read | 5 | |
| 32b DRAM Read | 640 | |

$$1 \qquad 10 \qquad 10^2 \qquad 10^3 \qquad 10^4$$

FIG. 5B

BASE KERNEL (EX., 256 BITS)

| | | | |
|---|---|---|---|
| 1001 | 1002 | 1003 | 1004 |
| 1005 | 1006 | 1007 | 1008 |
| 1009 | 1010 | 1011 | 1012 |
| 1013 | 1014 | 1015 | 1016 |

— 16 BITS

COMPUTATION ⇨

16 BITS

| | | | |
|---|---|---|---|
| 1013 | 1009 | 1005 | 1001 |
| 1014 | 1010 | 1006 | 1002 |
| 1015 | 1011 | 1007 | 1003 |
| 1016 | 1012 | 1008 | 1004 |

FIRST RESTORATION
(OR MODULATION)
KERNEL (EX., 256 BITS)

| | | | |
|---|---|---|---|
| 12 | 2 | 3 | -3 |
| 9 | 4 | -1 | -6 |
| 6 | 1 | -4 | -9 |
| 3 | -2 | -7 | -12 |

— 5 BITS

FIRST KERNEL FILTER
(EX., 80 BITS)

COMPUTATION ⇨

| | | | |
|---|---|---|---|
| 9 | 10 | 11 | 12 |
| 13 | 14 | 15 | 16 |
| 1 | 2 | 3 | 4 |
| 5 | 6 | 7 | 8 |

SECOND RESTORATION
(OR MODULATION)
KERNEL

| | | | |
|---|---|---|---|
| -3 | 8 | 8 | 15 |
| 4 | 10 | 16 | 22 |
| -5 | 1 | 7 | 15 |
| 2 | 8 | 14 | 20 |

— 5 BITS

SECOND KERNEL FILTER
(EX., 80 BITS)

FIG. 14

BASE KERNEL

RESTORATION
(OR MODULATION)
KERNEL

BASE KERNEL

RESTORATION
(OR MODULATION)
KERNEL

| APPLIED LAYER OF CHANNEL | RESTORATION (MODULATION) KERNEL | RESTORATION INFORMATION | | | |
| --- | --- | --- | --- | --- | --- |
| | | BASE KERNEL | KERNEL FILTER | MATHEMATICAL FUNCTION | COEFFICIENT OR OFFSET |
| CHANNEL ONE OF THE FIRST LAYER | FIRST KERNEL | FIRST KERNEL | – | – | – |
| LAYER 1 CHANNEL 2 | KERNEL 2 | FIRST KERNEL | FIRST KERNEL FILTER | – | – |
| LAYER 1 CHANNEL 3 | KERNEL 3 | FIRST KERNEL | FIRST KERNEL FILTER | ROTATION | – |
| LAYER 1 CHANNEL 4 | KERNEL 4 | FIRST KERNEL | KERNEL FILTER 2 | TRANSPOSE | 1 |
| . . . | . . . | . . . | . . . | . . . | . . . |
| LAYER 11 CHANNEL 1 | KERNEL 10 | KERNEL 10 | – | – | – |
| LAYER 11 CHANNEL 2 | KERNEL 11 | KERNEL 10 | KERNEL FILTER 6 | – | – |
| LAYER 11 CHANNEL 2 | KERNEL 12 | KERNEL 10 | KERNEL FILTER 8 | – | – |

FIG. 18

| MODE 1 | | | |
| --- | --- | --- | --- |
| FIRST KERNEL | | | |
| [10010111] | [10010111] | [00010111] | [00010110] |
| [10011111] | [11111111] | [00010100] | [00010000] |
| [00000111] | [10010111] | [10111111] | [00011000] |
| [10010111] | [10010111] | [00010111] | [00010110] |

FIG. 23A

| MODE 2-1 | | | |
|---|---|---|---|
| FIRST KERNEL | | | |
| [10010111] | [10010111] | [00010111] | [00010110] |
| [10011111] | [11111111] | [00010100] | [00010000] |
| [00000111] | [10010111] | [10111111] | [00011000] |
| [10010111] | [10010111] | [00010111] | [00010110] |

| ACTIVE AREA | ACTIVE AREA | ACTIVE AREA | ACTIVE AREA |

| MODE 2-2 | | | |
|---|---|---|---|
| FIRST KERNEL | | | |
| [10010111] | [10010111] | [00010111] | [00010110] |
| [10011111] | [11111111] | [00010100] | [00010000] |
| [00000111] | [10010111] | [10111111] | [00011000] |
| [10010111] | [10010111] | [00010111] | [00010110] |

| ACTIVE AREA | ACTIVE AREA | ACTIVE AREA | ACTIVE AREA |

| MODE 2-3 | | | |
|---|---|---|---|
| FIRST KERNEL | | | |
| [10010111] | [10010111] | [00010111] | [00010110] |
| [10011111] | [11111111] | [00010100] | [00010000] |
| [00000111] | [10010111] | [10111111] | [00011000] |
| [10010111] | [10010111] | [00010111] | [00010110] |

| ACTIVE AREA | ACTIVE AREA | ACTIVE AREA |

FIG. 23B

NPU FOR GENERATING FEATURE MAP BASED ON COEFFICIENTS AND METHOD THEREOF

CROSS-REFERENCE TO RELATED APPLICATIONS

This application is a continuation of U.S. patent application Ser. No. 17/498,766 filed on Oct. 12, 2021, which claims priority to Republic of Korean Patent Application No. 10-2020-0186375 filed on Dec. 29, 2020, each of which is incorporated herein by reference for all purposes as if fully set forth herein.

BACKGROUND OF THE DISCLOSURE

Technical Field

The present disclosure relates to artificial neural networks.

Background Art

Humans are equipped with intelligence that can perform recognition, classification, inference, prediction, and control/decision making. Artificial intelligence (AI) refers to artificially mimicking human intelligence.

The human brain is made up of a multitude of nerve cells called neurons. Each neuron is connected to hundreds to thousands of other neurons through connections called synapses. The modeling of the working principle of biological neurons and the connection relationship between neurons operate to mimic human intelligence and is called an artificial neural network (ANN) model. In other words, an artificial neural network is a system in which nodes imitating neurons are connected in a layer structure.

The ANN model is divided into a monolayer neural network and a multilayer neural network according to the number of layers, and a general multilayer neural network consists of input layers, hidden layers, and output layers. Here, the input layer is a layer receiving external data, in which the number of neurons of the input layer is the same as the number of input variables; the hidden layer is located between the input layer and the output layer and receives a signal from the input layer to extract features and transmit the features to the output layer; and the output layer receives a signal from the hidden layer and outputs the received signal to the outside. The input signal between the neurons is multiplied and then summed by each connection strength with a value of zero (0) to one (1), and if the sum is greater than a threshold of the neuron, neurons are activated and implemented as an output value through an activation function.

Meanwhile, in order to implement higher artificial intelligence, an increase in the number of hidden layers of an artificial neural network is called a deep neural network (DNN).

There are several types of DNNs, but convolutional neural networks (CNNs) are known to be easy to extract features from input data and identify patterns of features.

A convolutional neural network (CNN) is a neural network that functions similar to image processing in the visual cortex of the human brain. Convolutional neural networks are known to be suitable for image processing.

Referring to FIG. 7, the convolutional neural network is configured in a form in which convolutional channels and pooling channels are alternately repeated. In a convolutional neural network, most of the computation time is occupied by the operation of convolution. A convolutional neural network recognizes objects by extracting image features of each channel by a matrix-type kernel, and providing homeostasis such as movement or distortion by pooling. For each channel, a feature map is obtained by convolution of the input data and the kernel, and an activation function such as Rectified Linear Unit (ReLU) is applied to generate an activation map of the corresponding channel. Pooling may then be applied. The neural network that actually classifies the pattern is located at the end of the feature extraction neural network, and is called a fully connected layer. In the computational processing of convolutional neural networks, most computations are performed through convolution or matrix multiplication. At this time, the frequency of reading the necessary kernels from memory is quite frequent. A significant portion of the operation of the convolutional neural network takes time to read the kernels corresponding to each channel from the memory.

A memory consists of a plurality of memory cells, and each memory cell of the memory has a unique memory address. When the artificial neural network processor generates a kernel read command stored in the memory, a latency of several clock cycles may occur until the memory cell corresponding to the address of the memory is accessed.

Therefore, there is a problem in that the time and power consumed to read the necessary kernels from the memory and perform the convolution are significant.

SUMMARY OF THE DISCLOSURE

The inventor of the present disclosure has recognized that during the inference operation of the artificial neural network model, the NPU frequently reads the weight value of the node and/or the kernel of each layer of the artificial neural network model from a separate memory.

The inventor of the present disclosure has recognized that the processing speed of the neural processing unit (NPU) reading the weight values of nodes and/or kernels of the artificial neural network model from a separate memory is slow and consumes a lot of energy.

The inventor of the present disclosure has recognized that the kernels of the artificial neural network model that have been trained have very high similarity to each other.

The inventor of the present disclosure has recognized that the inference accuracy of the artificial neural network model may not substantially decrease even if the weight values of some kernels of the artificial neural network model are partially adjusted within a certain range.

Accordingly, the inventor of the present disclosure has recognized that kernels having a very high similarity to each other can be expressed by a simple equation with the reference kernel.

In addition, the inventor of the present disclosure has recognized that the inference accuracy of the artificial neural network model can be maintained at a commercially usable level even if the model is trained or retrained so that the similarity between the kernels of the artificial neural network model is very high, that is, the deviation between the kernels is small.

Accordingly, the inventor of the present disclosure has recognized that the artificial neural network model can be trained by setting the cost function during training for increasing the target accuracy and minimizing the maximum deviation between the reference kernel and the other kernels of the artificial neural network model.

In addition, the inventor of the present disclosure has recognized that it is possible to improve the processing speed and/or reduce power consumption of a system for processing an artificial neural network model when minimizing reading of node and/or kernel weight values from separate memory, and using a simple operation within the neural processing unit (NPU) to calculate and use the weight value of a node and/or kernel that is close to the reference node and/or kernel.

Accordingly, an aspect of the present disclosure is to provide a neural processing unit capable of generating a modulation kernel with a simple algorithm, reducing the number of read operations of a memory, reducing power consumption, and an operating method thereof.

However, the present disclosure is not limited thereto, and other aspects will be clearly understood by those skilled in the art from the following description.

According to an embodiment of the present disclosure, there is provided a neural processing unit (NPU) including a circuit. The circuit may include at least one processing element (PE) configured to process an operation of an artificial neural network (ANN) model; and at least one memory configurable to store a first kernel and a first kernel filter. The NPU may be configured to generate a first modulation kernel based on the first kernel and the first kernel filter.

The first kernel may include a K×M matrix, K and M being integers, and the K×M matrix may include at least one first weight value or weight values applicable to a first layer of the ANN model.

The first kernel filter may be configured to be generated based on a difference between at least one kernel weight value of the first kernel and at least one modulation kernel weight value of the first modulation kernel.

The first kernel filter may be set during a training process of the ANN model.

The circuit may be configured to generate the first modulation kernel based on the first kernel and the first kernel filter.

The circuit may be configured to generate a second modulation kernel based on the first kernel and a second kernel filter. The second kernel filter may be set to be generated by applying a mathematical function to the first kernel filter, and the mathematical function may include at least one of a delta function, a rotation function, a transpose function, a bias function, and a global weight function.

The circuit may be configured to generate a third modulation kernel based on one among the first kernel, the first kernel filter, the mathematical function applied to the first kernel or the first kernel filter, a coefficient applied to the first kernel or the first kernel filter, and an offset applied to the first kernel or the first kernel filter.

The at least one memory may be further configurable to store mapping information between at least one kernel and at least one kernel filter for generating at least one modulation kernel.

The ANN model may include information on bit allocation of first weight bits that are included in the first kernel filter for a first mode.

The NPU may operate in one of a plurality of modes, the plurality of modes including a first mode in which a first portion of a plurality of weight bits included in the first kernel to the ANN model are applied; and a second mode in which all of the plurality of weight bits included in the first kernel to the ANN model are applied. The weight bits in the first portion may be selected if the first portion is activated according to the first mode.

The first kernel may include a plurality of weight bits grouped into a first portion and a second portion, and the first portion and the second portion may be configured to be used selectively.

The first kernel filter may be configured such that a bit width for a value in the first kernel filter is smaller than a bit width of a weight of the first kernel.

According to another embodiment of the present disclosure, there is provided a method for driving an artificial neural network (ANN) model. The method may include performing a plurality of operations for the ANN model; and storing a plurality of kernels with a plurality of kernel filters for the plurality of operations. The plurality of operations may include generating a plurality of modulation kernels based on at least one of the plurality of kernels and a corresponding kernel filter of at least one of the plurality of kernel filters.

The plurality of operations performed for the ANN model may further include setting an arbitrary kernel among the plurality of kernels of the ANN model, the arbitrary kernel corresponding to a base kernel among the plurality of kernels; and setting an arbitrary kernel filter among the plurality of kernel filters for the arbitrary kernel corresponding to the base kernel.

The plurality of operations performed for the ANN model may further include training the ANN model based on a training data set and a validation data set with respect to an accuracy cost function and a weight size cost function; and determining mapping data between a base kernel among the plurality of kernels and an arbitrary kernel filter among the plurality of kernel filters.

The plurality of operations performed for the ANN model may be performed by a neural processing unit (NPU) comprising a circuit, the circuit including at least one processing element (PE) and at least one memory. The plurality of operations performed for the ANN model may further include reading a first kernel of the plurality of kernels from the at least one memory; performing a first operation by applying the first kernel of the plurality of kernels to a first layer of the ANN model or to a first channel of the ANN model; reading the kernel filter from the at least one memory; generating a first modulation kernel based on the first kernel of the plurality of kernels and a first kernel filter of the plurality of kernel filters; and performing a second operation for the ANN model by applying the first modulation kernel to a second layer of the ANN model or to a second channel of the ANN model.

According to another embodiment of the present disclosure, there is provided an apparatus. The apparatus may include a semiconductor substrate on which an electrically conductive pattern is formed; at least one first memory electrically connected to the semiconductor substrate and configurable to store information about a first kernel; and at least one neural processing unit (NPU) electrically connected to the substrate and configurable to access the at least one first memory, the NPU including a semiconductor circuit comprising at least one processing element (PE) configured to process an operation of an artificial neural network (ANN) model, and at least one internal memory configurable to store information about a first kernel filter. If the information about the first kernel is read from the at least one first memory, the first kernel may be stored in the at least one internal memory, and the operation of the ANN model may include generating a first modulation kernel based on the first kernel and the first kernel filter.

According to the present disclosure, by generating at least one base kernel and processing the convolution operation of the convolutional neural network, the power consumption required to read the corresponding kernel for each convolution operation can be reduced and the memory read time can be shortened.

According to the present disclosure, by utilizing the base kernel and the kernel filter, the number of kernels and/or the data size stored in the memory may be reduced.

In addition, there is an effect of reducing power consumption and reducing memory read time due to a decrease in the data size of the kernel read from memory to the artificial neural network processor and/or a decrease in the number of memory read requests.

In addition, according to the present disclosure, the amount of data transfer and/or the number of memory read requests of the memory and neural processing unit can be reduced. Since the occurrence of data starvation and/or the idle (IDLE) time of the artificial neural network processor is reduced, the operation efficiency of the artificial neural network processor can be improved.

BRIEF DESCRIPTION OF THE DRAWINGS

FIG. 5B is memories an example diagram illustrating energy consumption during operation of the neural processing unit 100.

FIG. 14 is an exemplary diagram illustrating another example of restoring an original kernel or generating a kernel similar to the original kernel.

FIG. 18 is an exemplary diagram illustrating a kernel generation algorithm (or a kernel restoration algorithm) arranged in a table for better comprehension.

FIGS. 23A and 23B are exemplary views showing the active bits of the kernel for each mode.

DETAILED DESCRIPTION OF THE EMBODIMENT

Figure 1:
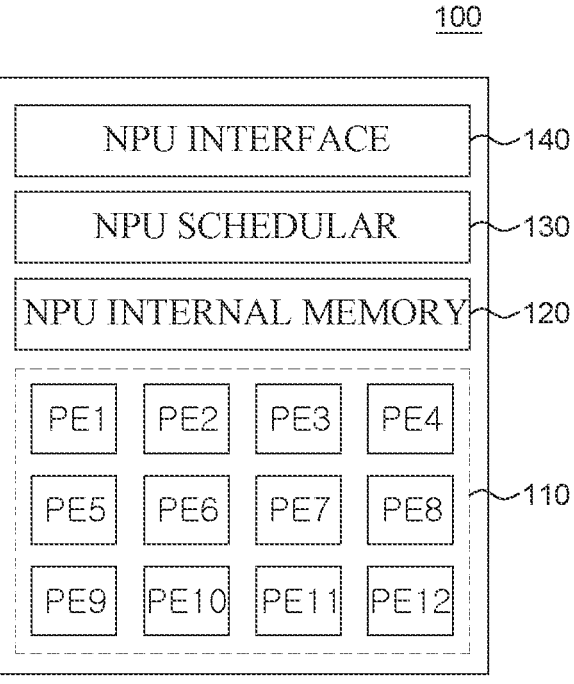
FIG. 1 is a schematic diagram illustrating a neural processing unit according to the present disclosure.

Particular structural or step-by-step descriptions for embodiments according to the concept of the present disclosure disclosed in the present specification or application are merely exemplified for the purpose of explaining the embodiments according to the concept of the present disclosure, and embodiments according to the concept of the present disclosure may be embodied in various forms, and embodiments according to the concept of the present disclosure may be embodied in various forms, and should not be construed as being limited to the embodiments described in the present specification or application.

Since the embodiment according to the concept of the present disclosure may have various modifications and may have various forms, specific embodiments will be illustrated in the drawings and described in detail in the present specification or application. However, this is not intended to limit the embodiment according to the concept of the present disclosure with respect to the specific disclosure form, and should be understood to include all modifications, equivalents, and substitutes included in the spirit and scope of the present disclosure.

Terms such as first and/or second may be used to describe various elements, but the elements should not be limited by the terms. The above terms are only for the purpose of distinguishing one element from another element, for example, without departing from the scope according to the concept of the present disclosure, and a first element may be termed a second element, and similarly, a second element may also be termed a first element.

When an element is referred to as being "connected to" or "in contact with" another element, it is understood that the other element may be directly connected to or in contact with the other element, but other elements may be disposed therebetween. On the other hand, when it is mentioned that a certain element is "directly connected to" or "in direct contact with" another element, it should be understood that no other element is present therebetween. Other expressions describing the relationship between elements, such as "between" and "immediately between" or "adjacent to" and "immediately adjacent to," etc., should be interpreted similarly.

The terms used herein are used only to describe specific embodiments, and are not intended to limit the present disclosure. The singular expression may include the plural expression unless the context clearly dictates otherwise.

It should be understood that as used herein, terms such as "comprise" or "have" are intended to designate that the stated feature, number, step, action, component, part, or combination thereof exists, but it does not preclude the possibility of addition or existence of at least one other features or numbers, steps, operations, elements, parts, or combinations thereof.

Unless defined otherwise, all terms used herein, including technical or scientific terms, have the same meaning as commonly understood by one of ordinary skill in the art to which this disclosure pertains. Terms such as those defined in a commonly used dictionary should be interpreted as having a meaning consistent with the meaning in the context of the related art, and should not be interpreted in an ideal or excessively formal meaning unless explicitly defined in the present specification.

In describing the embodiments, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Hereinafter, in order to facilitate understanding of the disclosures presented in the present specification, terms used in the present specification will be briefly summarized.

NPU: an abbreviation of Neural Processing Unit (NPU), which may refer to a processor specialized for computation of an artificial neural network model separately from a central processing unit (CPU).

ANN: an abbreviation of artificial neural network. In order to imitate human intelligence, it may refer to a network in which nodes are connected in a layer structure by mimicking those neurons in the human brain are connected through synapse.

Information on the structure of the artificial neural network: Information including information on the number of layers, the number of nodes in a layer, the value of each node, information on an operation processing method, information on a weight matrix applied to each node, and the like.

Information on data locality of artificial neural network: information that allows the neural processing unit to predict the operation order of the artificial neural network model processed by the neural processing unit based on the data access request order requested to a separate memory.

DNN: an abbreviation of Deep Neural Network, which may mean that the number of hidden layers of the artificial neural network is increased in order to implement higher artificial intelligence.

CNN: an abbreviation for Convolutional Neural Network, a neural network that functions similar to image processing in the visual cortex of the human brain. Convolutional neural networks are known to be suitable for image processing, and are known to be superior to extract features from input data and identify patterns of features.

Kernel: it may mean a weight matrix applied to CNN.

Base kernel: it may mean a kernel having representativeness among a plurality of kernels applied to CNN.

Kernel filter: it may mean a value used to generate/regenerate another kernel from a base kernel or a matrix including values.

Hereinafter, the present disclosure will be described in detail by describing preferred embodiments of the present disclosure with reference to the accompanying drawings. Hereinafter, embodiments of the present disclosure will be described in detail with reference to the accompanying drawings.

FIG. 1 illustrates a neural processing unit according to the present disclosure.

The neural processing unit (NPU) 100 of FIG. 1 is a processor specialized to perform an operation for an artificial neural network.

An artificial neural network refers to a network of artificial neurons that multiplies and adds weights when multiple inputs or stimuli are received, and transforms and transmits the value added with an additional bias through an activation function. The artificial neural network trained in this way can be used to output inference results from input data.

The neural processing unit 100 may be a semiconductor implemented as an electric/electronic circuit. The electric/electronic circuit may include a number of electronic components (e.g., a transistor and a capacitor). The neural processing unit 100 may include a processing element (PE) array 110, an NPU internal memory 120, an NPU scheduler 130, and an NPU interface 140. Each of the processing element array 110, the NPU internal memory 120, the NPU scheduler 130, and the NPU interface 140 may be a semiconductor circuit to which numerous transistors are connected. Accordingly, some of them may be difficult to identify and distinguish with human eyes, and may be identified only by its operation. For example, any circuit may operate as the processing element array 110, or may operate as the NPU scheduler 130.

The neural processing unit 100 may include a processing element array 110, an NPU internal memory 120 configured to store an artificial neural network model that can be inferred by the processing element array 110, an NPU scheduler 130 configured to control the processing element array 110 and the NPU internal memory 120 based on the information on data locality information or structure of the artificial neural network model. Here, the artificial neural network model may include information on data locality or structure of the artificial neural network model. The artificial neural network model may refer to an AI recognition model trained to perform a specific inference function.

The processing element array 110 may perform an operation for an artificial neural network. For example, when input data is input, the processing element array 110 may cause the artificial neural network to perform training. After training is completed, if input data is input, the processing element array 110 may perform an operation of deriving an inference result through the trained artificial neural network.

Figure 5A:
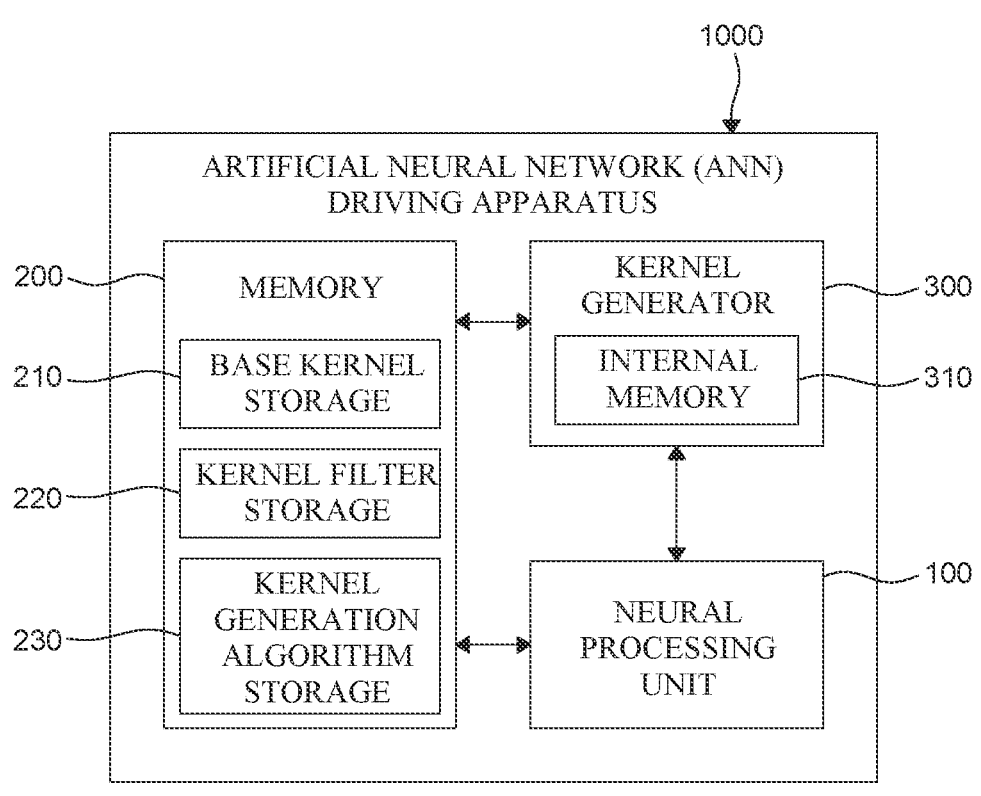
FIG. 5A is an exemplary diagram illustrating the configuration of an ANN driving apparatus including the neural processing unit 100 of FIG. 1 or FIG. 3.
Figure 6A:
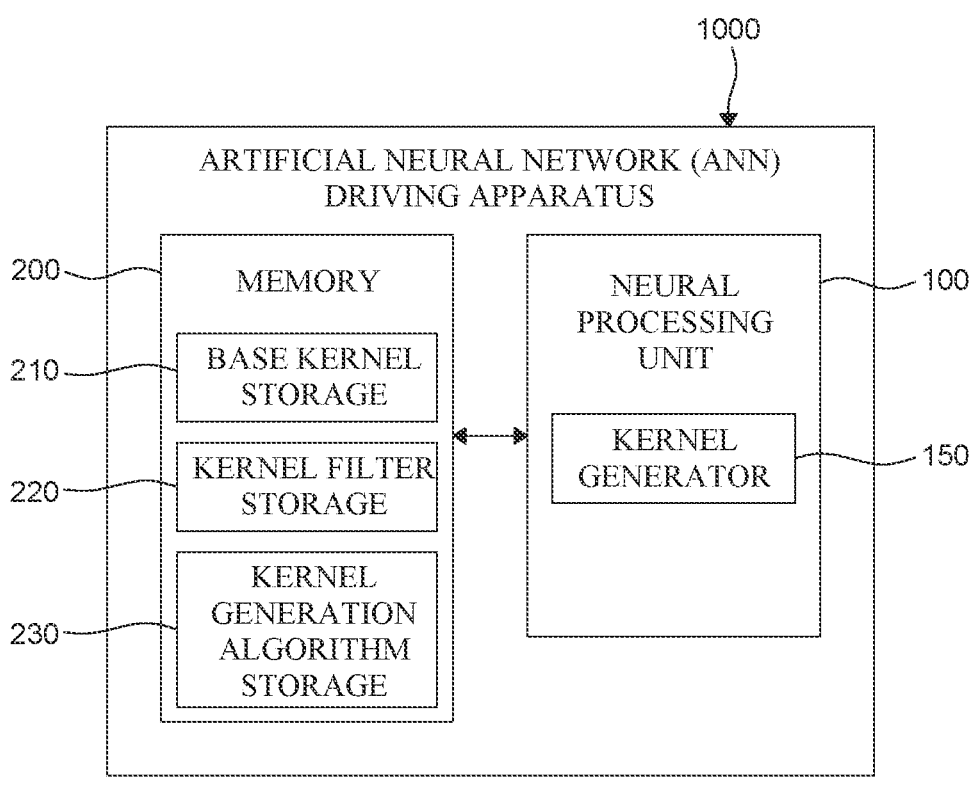
FIG. 6A is an exemplary diagram illustrating a modified configuration of ANN driving apparatus including the neural processing unit 100 of FIG. 1 or FIG. 3.
Figure 6B:
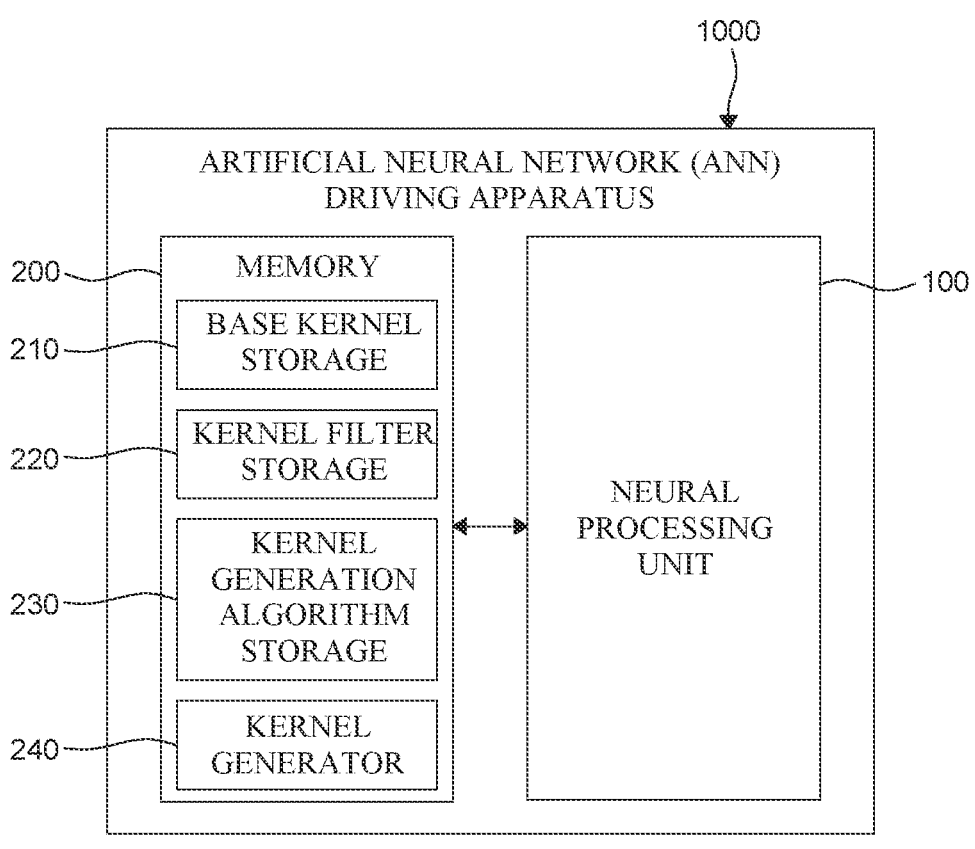
FIG. 6B is an exemplary diagram illustrating a modified configuration of an ANN driving apparatus including the neural processing unit 100 of FIG. 1 or FIG. 3.

The NPU interface 140 may communicate with various elements in the ANN driving apparatus of FIG. 5A, FIG. 6A or FIG. 6B, such as a memory through a system bus.

For example, the neural processing unit 100 may load the data of the artificial neural network model stored in the memory 200 of FIG. 5A, FIG. 6A or FIG. 6B through the NPU interface 140 to the NPU internal memory 120.

The NPU scheduler 130 may be configured to control the operation of the processing element array 110 for the inference operation of the neural processing unit 100 and the read and write sequence of the NPU internal memory 120.

The NPU scheduler 130 may be configured to control the processing element array 110 and the NPU internal memory 120 by analyzing the data locality information or information about the structure of the artificial neural network model.

NPU scheduler 130 may analyze the structure of the artificial neural network model to operate in the processing element array 110. The artificial neural network data that the artificial neural network model may include may store node data of each layer, information on locality or structure of arrangement data of layers, and weight data of each connection network connecting nodes of each layer. The data of the artificial neural network may be stored in a memory provided inside the NPU scheduler 130 or the NPU internal memory 120. The NPU scheduler 130 may utilize the necessary data by accessing the memory 200 of FIG. 5A, FIG. 6A or FIG. 6B. However, the present disclosure is not limited thereto; that is, the data locality information or information on the structure of the artificial neural network model may be generated based on data such as node data and weight data of the artificial neural network model. It is also possible that the weight data is referred to as a weight kernel. The node data may also be referred to as a feature map. For example, the data in which the structure of the artificial neural network model is defined may be generated when the artificial neural network model is designed or training is completed. However, the present disclosure is not limited thereto.

The NPU scheduler 130 may schedule the operation sequence of the artificial neural network model based on the data locality information or the structure information of the artificial neural network model.

The NPU scheduler 130 may obtain a memory address value in which node data of a layer of an artificial neural network model and weight data of a connection network are stored based on data locality information or structure information of the artificial neural network model. For example, the NPU scheduler 130 may obtain a memory address value in which node data of a layer of an artificial neural network model stored in a memory and weight data of a connection network are stored. Therefore, the NPU scheduler 130 may bring the node data of the layer of the artificial neural network model to be driven and the weight data of the connection network from the memory 200 and store in the NPU internal memory 120. Node data of each layer may have a corresponding respective memory address value. Weight data of each connection network may have a corresponding respective memory address value.

The NPU scheduler 130 may schedule the operation sequence of the processing element array 110 based on data locality information or structure information of the artificial neural network model, for example, information on locality information or structure of the layers of the artificial neural network of the artificial neural network model.

Since the NPU scheduler 130 performs scheduling based on data locality information or structure information of the artificial neural network model, it may operate differently from the general CPU scheduling concept. Scheduling of a general CPU operates to achieve the best efficiency by considering fairness, efficiency, stability, and response time. That is, it is scheduled to perform the most processing jobs within the same time in consideration of priority and operation time.

Conventional CPUs use an algorithm for scheduling tasks in consideration of data such as priority order of each processing and operation processing time.

However, the NPU scheduler 130 may determine the processing sequence based on information on the data locality or structure of the artificial neural network model.

Further, the NPU scheduler 130 may determine the processing sequence based on information on the data locality information or structure of the artificial neural network model and/or the data locality information or information on the structure of the neural processing unit 100 to be used.

However, the present disclosure is not limited to information on data locality information or structure of the neural processing unit 100. For example, information on the data locality information or structure of the neural processing unit 100 may determine the processing sequence by utilizing at least one of the memory size of the NPU internal memory 120, the hierarchy structure of the NPU internal memory 120, the number of processing elements PE1 to PE12 data, and the operator architecture of the processing elements PE1 to PE12. That is, the information on the data locality information or structure of the neural processing unit 100 may include at least one data of the memory size of the NPU internal memory 120, the hierarchy structure of the NPU internal memory 120, the number data of the processing elements PE1 to PE12, and the operator architecture of the processing elements PE1 to PE12. However, the present disclosure is not limited to information on data locality information or structure of the neural processing unit 100. The memory size of the NPU internal memory 120 may include information about the memory capacity. The hierarchical structure of the NPU internal memory 120 may include information on a connection relationship between specific hierarchies for each hierarchical structure. The operator architecture of the processing elements PE1 to PE12 may include information about the components inside the processing element.

The neural processing unit 100 according to an embodiment of the present disclosure may include at least one processing element, an NPU internal memory 120 that can store an artificial neural network model that can be inferred by the at least one processing element, and an NPU scheduler 130 configured to control the at least one processing element and the NPU internal memory 120 based on the data locality information or structure information of the artificial neural network model. The NPU scheduler 130 may be configured to further receive information about the data locality information or structure of the neural processing unit 100. In addition, the information on the data locality information or the structure of the neural processing unit 100 may include at least one data of a memory size of the NPU internal memory 120, a hierarchy structure of the NPU internal memory 120, the number data of at least one processing element, and an operator architecture of the at least one processing element.

According to the structure of the artificial neural network model, calculations for each layer are sequentially performed. That is, when the structure of the artificial neural network model is determined, the operation sequence for each layer may be determined. The sequence of operations or data flow according to the structure of the artificial neural network model can be defined as the data locality of the artificial neural network model at the algorithm level.

When the compiler compiles the neural network model to be executed in the neural processing unit 100, the neural network data locality of the neural network model at the neural processing unit-memory level may be reconstructed.

That is, the data locality of the neural network model at the neural processing unit-memory level may be configured according to the compiler, algorithms applied to the neural network model, and operating characteristics of the neural processing unit 100.

For example, even in the case of the same artificial neural network model, the locality of the artificial neural network data of the artificial neural network model to be processed may be configured differently according to the method in which the neural processing unit 100 calculates the corresponding artificial neural network model, for example, feature map tiling, stationary technique of the processing elements and the like, the number of processing elements of the neural processing unit 100, the cache memory size of the feature map and weights in the neural processing unit 100, the memory hierarchy in the neural processing unit 100, the algorithm characteristics of the compiler that determines the sequence of the computational operations of the neural processing unit 100 for processing the artificial neural network model and the like. This is because, even if the same artificial neural network model is processed by the above-described factors, the neural processing unit 100 may differently determine the order of data required at each operation in clock cycle units.

The compiler may configure the neural network data locality of the neural network model at the neural processing unit-memory level in word units of the neural processing unit 100 to determine the sequence of data required for physical operation processing.

In other words, the neural network data locality of an artificial neural network model that exists at the neural processing unit-memory level can be defined as information that allows the neural processing unit 100 to predict the operation sequence of the artificial neural network model processed by the neural processing unit 100 based on the data access request sequence requested to the memory 200.

NPU scheduler 130 may be configured to store information about the data locality information or structure of the artificial neural network.

That is, the NPU scheduler 130 may determine the processing sequence even if only information on the data locality information or structure of the artificial neural network of the artificial neural network model is utilized at least. That is, the NPU scheduler 130 may determine the operation sequence by using information about the data locality or structure from the input layer to the output layer of the artificial neural network. For example, an input layer operation may be scheduled first and an output layer operation may be scheduled last. Therefore, when the NPU scheduler 130 is provided with information on the data locality information or structure of the artificial neural network model, it is possible to know all the operation sequence of the artificial neural network model. Therefore, there is an effect that all scheduling sequence can be determined.

Furthermore, the NPU scheduler 130 may determine the processing sequence in consideration of the information on the data locality information or structure of the artificial neural network model and the data locality information or information on the structure of the neural processing unit 100. Furthermore, the NPU scheduler 130 may optimize the processing for each determined sequence.

Therefore, when the NPU scheduler 130 receives information on data locality information or structure of the artificial neural network model and information on data locality information or structure of the neural processing unit 100, there is an effect of further improving the computational efficiency of each scheduling sequence determined by the data locality information or the structure information of the artificial neural network model. For example, the NPU scheduler 130 may obtain four layers of artificial neural network layers and network data having weight data of three layers connecting each layer. In this case, the NPU scheduler 130 will be described below, for example, with respect to a method of scheduling a processing sequence based on information on the data locality information or structure of the artificial neural network model.

For example, the NPU scheduler 130 may schedule to first set input data for inference operation as node data of a first layer that is an input layer of an artificial neural network model, and to then perform a multiply and accumulate (MAC) operation of node data of the first layer and weight data of a first connection network corresponding to the first layer at first. However, the examples of the present disclosure are not limited to the MAC operation, and the artificial neural network operation may be performed using multipliers and adders that can be variously modified and implemented to perform the artificial neural network operation. Hereinafter, for convenience of description, a corresponding operation may be referred to as a first operation, a result of the first operation may be referred to as a first operation value, and a corresponding scheduling may be referred to as a first scheduling.

For example, the NPU scheduler 130 may set the first operation value to the node data of the second layer corresponding to the first connection network, and may schedule the MAC operation of the node data of the second layer and the weight data of the second connection network corresponding to the second layer to be performed after the first scheduling. Hereinafter, for convenience of description, a corresponding operation may be referred to as a second operation, a result of the second operation may be referred to as a second operation value, and a corresponding scheduling may be referred to as a second scheduling.

For example, the NPU scheduler 130 may set the second operation value to the node data of the third layer corresponding to the second connection network, and may schedule the MAC operation of the node data of the third layer and the weight data of the third connection network corresponding to the third layer to be performed at the second scheduling. Hereinafter, for convenience of description, a corresponding operation may be referred to as a third operation, a result of the third operation may be referred to as a third operation value, and a corresponding scheduling may be referred to as a third scheduling.

For example, the NPU scheduler 130 may set the third operation value to the node data of the fourth layer corresponding to the third connection network, and may schedule to store the inference result stored in the node data of the fourth layer in the NPU internal memory 120. Hereinafter, for convenience of description, the corresponding scheduling may be referred to as a fourth scheduling.

In summary, the NPU scheduler 130 may control the NPU internal memory 120 and the processing element array 110 so that the operation is performed in the first scheduling, the second scheduling, the third scheduling, and the fourth scheduling sequence. That is, the NPU scheduler 130 may be configured to control the NPU internal memory 120 and the processing element array 110 so that operations are performed in a set scheduling sequence.

In summary, the neural processing unit 100 according to an embodiment of the present disclosure may be configured to schedule a processing sequence based on a structure of layers of an artificial neural network and operation sequence data corresponding to the structure.

For example, the NPU scheduler 130 may be configured to schedule a processing sequence based on structure data from an input layer to an output layer of an artificial neural network of an artificial neural network model or artificial neural network data locality information.

The NPU scheduler 130 controls the NPU internal memory 120 by utilizing the scheduling sequence based on the artificial neural network model structure data or the artificial neural network data locality information to improve the operation rate of the neural processing unit. Accordingly, there is an effect of improving the operation rate of the neural processing unit and the memory reuse rate.

Due to the nature of the artificial neural network operation driven by the neural processing unit 100 according to an embodiment of the present disclosure, the operation value of one layer may characteristically become input data of the next layer.

Thus, when the neural processing unit 100 controls the NPU internal memory 120 according to the scheduling sequence, there is an effect that can improve the memory reuse rate of the NPU internal memory 120. Memory reuse can be determined by the number of times the data stored in the memory is read. For example, if specific data is stored in the memory and then the specific data is read only once and then the corresponding data is deleted or overwritten, the memory reuse rate may be 100%. For example, if specific data is stored in the memory, the specific data is read four times, and then the corresponding data is deleted or overwritten, the memory reuse rate may be 400%. The memory reuse rate may be defined as the number of reuses of initially stored data. That is, memory reuse may mean reusing data stored in the memory or a specific memory address in which specific data is stored.

Specifically, if the NPU schedular 130 is configured to receive structure data or artificial neural network data locality information of an artificial neural network model when the provided structure data of an artificial neural network model or the artificial neural network data locality information can determine the sequence data of the artificial neural network operation, then the NPU scheduler 130 recognizes that the operation result of the node data of the specific layer of the artificial neural network model, and the weight data of the specific connection network becomes the node data of the next corresponding layer.

Therefore, the NPU scheduler 130 may reuse the value of the memory address in which the specific operation result is stored in the subsequent operation. Accordingly, the memory reuse rate may be improved.

For example, the first operation value of the above-described first scheduling is set as node data of the second layer of the second scheduling. Specifically, the NPU scheduler 130 may reset the memory address value corresponding to the first operation value of the first scheduling stored in the NPU internal memory 120 to a memory address value corresponding to the node data of the second layer of the second scheduling. That is, the memory address value can be reused. Therefore, as the NPU scheduler 130 reuses the data of the memory address of the first scheduling, there is an effect that the NPU internal memory 120 may utilize the second layer node data of the second scheduling without a separate memory write operation.

For example, the second operation value of the above-described second scheduling is set as node data of the third layer of the third scheduling. Specifically, the NPU scheduler 130 may reset the memory address value corresponding to the second operation value of the second scheduling stored in the NPU internal memory 120 to a memory address value corresponding to the node data of the third layer of the third scheduling. That is, the memory address value can be reused. Therefore, as the NPU scheduler 130 reuses the data of the memory address of the second scheduling, there is an effect that the NPU internal memory 120 may utilize the third layer node data of the third scheduling without a separate memory write operation.

For example, the third operation value of the above-described third scheduling is set as node data of the fourth layer of the fourth scheduling. Specifically, the NPU scheduler 130 may reset the memory address value corresponding to the third operation value of the third scheduling stored in the NPU internal memory 120 to a memory address value corresponding to the node data of the fourth layer of the fourth scheduling. That is, the memory address value can be reused. Therefore, as the NPU scheduler 130 reuses the data of the memory address of the third scheduling, there is an effect that the NPU internal memory 120 may utilize the fourth layer node data of the fourth scheduling without a separate memory write operation.

Furthermore, it is also possible that the NPU scheduler 130 is configured to control the NPU internal memory 120 by determining the scheduling sequence and memory reuse. In this case, there is an effect that the NPU scheduler 130 can provide efficient scheduling by analyzing the artificial neural network model structure data or the artificial neural network data locality information. In addition, since data required for memory reusable operation may not be duplicated and stored in the NPU internal memory 120, there is an effect that memory usage can be reduced. In addition, the NPU scheduler 130 has an effect that can increase the efficiency of the NPU internal memory 120 by calculating the memory usage reduced by the memory reuse.

Furthermore, the NPU scheduler 130 may be configured to monitor the resource usage of the NPU internal memory 120, the resource usage of the processing elements PE1 to PE12, based on the structure data of the neural processing unit 100. Accordingly, there is an effect of improving the hardware resource utilization efficiency of the neural processing unit 100.

The NPU scheduler 130 of the neural processing unit 100 according to an embodiment of the present disclosure has the effect of reusing the memory by utilizing the artificial neural network model structure data or the artificial neural network data locality information.

In other words, when the artificial neural network model is a deep neural network, the number of layers and the number of connections can be significantly increased, and in this case, the effect of memory reuse can be further maximized.

That is, if the neural processing unit 100 does not identify the structure data or the artificial neural network data locality information and the operation sequence of the artificial neural network model, the NPU scheduler 130 cannot determine whether to reuse the memory of the values stored in the NPU internal memory 120. Accordingly, the NPU scheduler 130 unnecessarily generates a memory address required for each processing, and substantially the same data must be copied from one memory address to another. Therefore, unnecessary memory read and write operations are generated, and duplicate values are stored in the NPU internal memory 120, which may cause a problem in which memory is wasted unnecessarily.

The processing element array 110 means a configuration in which a plurality of processing elements PE1 to PE12, configured to calculate node data of an artificial neural network and weight data of a connection network, are disposed. Each processing element may be configured to include a multiply and accumulate (MAC) operator and/or an arithmetic logic unit (ALU) operator. However, embodiments according to the present disclosure are not limited thereto. The processing element array 110 may be referred to as a plurality of processing elements and each processing element may operate independently from each other or a group of processing element may operate as a group.

Figure 2:
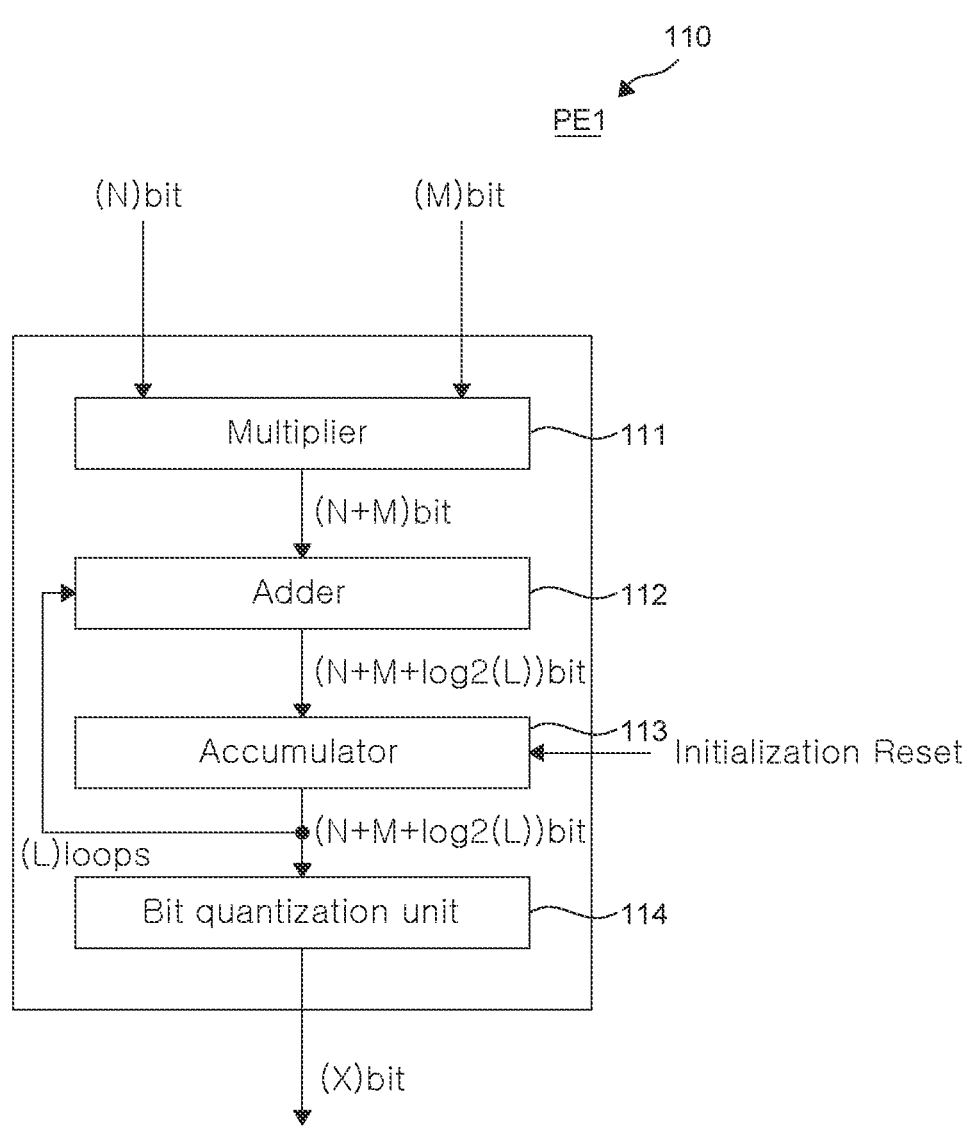
FIG. 2 is a schematic diagram illustrating one processing element of a processing element array that may be applied to the present disclosure.

Although FIG. 2 illustrates a plurality of processing elements, it is also possible to configure operators implemented as a plurality of multipliers and adder trees to be arranged in parallel by replacing the MAC in one processing element. In this case, the processing element array 110 may be referred to as at least one processing element including a plurality of operators.

The processing element array 110 is configured to include a plurality of processing elements PE1 to PE12. The plurality of processing elements PE1 to PE12 of FIG. 2 is merely an example for convenience of description, and the number of the plurality of processing elements PE1 to PE12 is not limited thereto. The size, or number, of the processing element array 110 may be determined by the number of the plurality of processing elements PE1 to PE12. The size of the processing element array 110 may be implemented in the form of an N×M matrix. Here, N and M are integers greater than zero. The processing element array 110 may include N×M processing elements. That is, there may be at least one processing element.

The size of the processing element array 110 may be designed in consideration of the characteristics of the artificial neural network model in which the neural processing unit 100 operates. In other words, the number of processing elements may be determined in consideration of the data size of the artificial neural network model to be operated, the required operating speed, the required power consumption, and the like. The size of the data of the artificial neural network model may be determined in correspondence with the number of layers of the artificial neural network model and the weight data size of each layer.

Accordingly, the size of the processing element array 110 of the neural processing unit 100 according to an embodiment of the present disclosure is not limited thereto. As the number of processing elements of the processing element array 110 increases, the parallel computing power of the artificial neural network model which is operating increases, but manufacturing cost and physical size of the neural processing unit 100 may increase.

For example, the artificial neural network model operated in the neural processing unit 100 may be an artificial neural network trained to detect thirty specific keywords, that is, an AI keyword recognition model. In this case, the size of the processing element array 110 of the neural processing unit 100 may be designed to be 4×3 in consideration of the computational amount characteristic. In other words, the neural processing unit 100 may be configured to include twelve processing elements. However, it is not limited thereto, and the number of the plurality of processing elements PE1 to PE12 may be selected within a range of, for example, 8 to 16,384. That is, embodiments of the present disclosure are not limited in the number of processing elements.

The processing element array 110 is configured to perform functions such as addition, multiplication, and accumulation required for an artificial neural network operation. In other words, the processing element array 110 may be configured to perform a multiplication and accumulation (MAC) operation.

Hereinafter, the first processing element PE1 of the processing element array 110 will be described as an example with respect to FIG. 2.

FIG. 2 illustrates one processing element, i.e., PE1, of an array of processing elements PE1 to PE12 of FIG. 1 that may be applied to an embodiment of the present disclosure.

Referring again briefly to FIG. 1, the neural processing unit 100 according to an embodiment of the present disclosure includes a processing element array 110, an NPU internal memory 120 configured to store an artificial neural network model that can be inferred from the processing element array 110 or to store at least some data of the artificial neural network model, and an NPU scheduler 130 configured to control the processing element array 110 and the NPU internal memory 120 based on the artificial neural network model structure data or the artificial neural network data locality information, and the processing element array 110 may be configured to quantize and output a MAC operation result. However, embodiments of the present disclosure are not limited thereto.

The NPU internal memory 120 may store all or part of the artificial neural network model according to the memory size and the data size of the artificial neural network model.

Referring to FIG. 2, the first processing element PE1 may be configured to include a multiplier 111, an adder 112, an accumulator 113, and a bit quantization unit 114. However, embodiments according to the present disclosure are not limited thereto, and the processing element array 110 may be modified in consideration of the computational characteristics of the artificial neural network.

The multiplier 111 multiplies the received (N) bit data and (M) bit data. The operation value of the multiplier 111 is output as (N+M) bit data, where N and M are integers greater than zero. The first input unit for receiving (N) bit data may be configured to receive a value having a characteristic such as a variable, and the second input unit for receiving the (M) bit data may be configured to receive a value having a characteristic such as a constant. When the NPU scheduler 130 distinguishes the variable value and the constant value characteristic, the NPU scheduler 130 has the effect of increasing the memory reuse rate of the NPU internal memory 120. However, the input data of the multiplier 111 is not limited to constant values and variable values. That is, according to the embodiments of the present disclosure, since the input data of the processing element may operate by understanding the characteristics of the constant value and the variable value, the computational efficiency of the neural processing unit 100 may be improved. However, the neural processing unit 100 is not limited to the characteristics of constant values and variable values of input data.

Here, the meaning of a value having a variable-like characteristic or the meaning of a variable means that a value of a memory address in which the corresponding value is stored is updated whenever incoming input data is updated. For example, the node data of each layer may be a MAC operation value in which the weight data of the artificial neural network model is applied. In the case of inferring object recognition of moving image data with the corresponding artificial neural network model, since the input image changes every frame, the node data of each layer changes.

Here, the meaning of a value having constant-like characteristics or the meaning of a constant means that the value of the memory address in which the corresponding value is stored is preserved regardless of the update of incoming input data. For example, the weight data of the connection network is a unique inference determination criterion of the artificial neural network model, and even if object recognition of moving image data is inferred by the artificial neural network model, the weight data of the connection network may not change.

That is, the multiplier 111 may be configured to receive one variable and one constant. In more detail, the variable value input to the first input unit may be node data of the layer of the artificial neural network, and the node data may be input data of the input layer of the artificial neural network, the accumulated value of the hidden layer, and the accumulated value of the output layer. The constant value input to the second input unit may be weight data of a connection network of an artificial neural network.

NPU scheduler 130 may be configured to improve the memory reuse rate in consideration of the characteristics of the constant value.

The variable value is the calculated value of each layer, and the NPU scheduler 130 may control the NPU internal memory 120 to recognize reusable variable values and reuse the memory based on the artificial neural network model structure data or the artificial neural network data locality information.

The constant value is the weight data of each network, and the NPU scheduler 130 may control the NPU internal memory 120 to recognize the constant value of the repeatedly used connection network and reuse the memory based on the artificial neural network model structure data or the artificial neural network data locality information.

That is, the NPU scheduler 130 recognizes reusable variable values and reusable constant values based on structure data or artificial neural network data locality information of an artificial neural network model, and the NPU scheduler 130 may be configured to control the NPU internal memory 120 to reuse the memory.

When zero is inputted to one of the first input unit and the second input unit of the multiplier 111, the processing element knows that the result of the operation is zero even if it does not perform the operation. Thus, the operation of the multiplier 111 may be limited so that the operation is not performed.

For example, when zero is inputted to one of the first input unit and the second input unit of the multiplier 111, the multiplier 111 may be configured to operate in a zero-skipping manner.

The number of bits of data input to the first input unit and the second input unit may be determined according to a quantization of node data and weight data of each layer of the artificial neural network model. For example, node data of the first layer may be quantized to five bits and weight data of the first layer may be quantized to seven bits. In this case, the first input unit may be configured to receive five-bit data, and the second input unit may be configured to receive seven-bit data.

The neural processing unit 100 may control the number of quantized bits to be converted in real time when the quantized data stored in the NPU internal memory 120 is input to the inputs of the processing element. That is, the number of quantized bits can be different for each layer, and when the number of bits of input data is converted, the processing element may be configured to receive bit number information from the neural processing unit 100 in real time and convert the number of bits in real time to generate input data.

The accumulator 113 accumulates the operation value of the multiplier 111 and the operation value of the accumulator 113 by using the adder 112 for a number of L loops. Accordingly, the number of bits of data in the output unit and the input unit of the accumulator 113 may be output as (N+M+log 2(L)) bits, where L is an integer greater than zero.

When the accumulation is finished, the accumulator 113 may receive an initialization reset to initialize the data stored in the accumulator 113 to zero. However, embodiments according to the present disclosure are not limited thereto.

The bit quantization unit 114 may reduce the number of bits of data outputted from the accumulator 113. The bit quantization unit 114 may be controlled by the NPU scheduler 130. The number of bits of the quantized data may be output as X bits, where X is an integer greater than zero. According to the above configuration, the processing element array 110 is configured to perform a MAC operation, and the processing element array 110 has an effect of quantizing and outputting the MAC operation result. In particular, such quantization has the effect of further reducing power consumption as the number of L loops increases. In addition, if the power consumption is reduced, there is an effect that the heat generation of the edge device can also be reduced. In particular, reducing heat generation has an effect of reducing the possibility of malfunction due to high temperature of the neural processing unit 100.

The output data X bit of the bit quantization unit 114 may be node data of a next layer or input data of convolution. If the artificial neural network model has been quantized, the bit quantization unit 114 may be configured to receive quantized information from the artificial neural network model. However, it is not limited thereto, and the NPU scheduler 130 may be configured to extract quantized information by analyzing the artificial neural network model. Therefore, the output data X bits may be converted into the quantized number of bits to correspond to the quantized data size and output. The output data X bit of the bit quantization unit 114 may be stored in the NPU internal memory 120 as the number of quantized bits.

The processing element array 110 of the neural processing unit 100 according to an embodiment of the present disclosure includes a multiplier 111, an adder 112, an accumulator 113, and a bit quantization unit 114. The processing element array 110 may reduce the number of bits of (N+M+log 2(L)) bit data output from the accumulator 113 by the bit quantization unit 114 to the number of bits of X bit. The NPU scheduler 130 may control the bit quantization unit 114 to reduce the number of bits of the output data by a predetermined bit from a least significant bit (LSB) to a most significant bit (MSB). When the number of bits of output data is reduced, power consumption, calculation amount, and memory usage may be reduced. However, when the number of bits is reduced below a specific length, there may be a problem in that the inference accuracy of the artificial neural network model may be rapidly reduced. Accordingly, the reduction in the number of bits of the output data, that is, the quantization degree, can be determined based on the reduction in power consumption, the amount of computation, and the amount of memory usage compared to the reduction in inference accuracy of the artificial neural network model. It is also possible to determine the quantization degree by determining the target inference accuracy of the artificial neural network model and testing it while gradually reducing the number of bits. The quantization degree may be determined for each operation value of each layer.

According to the above-described first processing element PE1, by adjusting the number of bits of N-bit data and M-bit data of the multiplier 111 and reducing the number of bits of the operation value X bit by the bit quantization unit 114, the processing element array 110 has the effect of reducing power consumption while improving the MAC operation speed, and has the effect of more efficiently performing the convolution operation of the artificial neural network.

The NPU internal memory 120 of the neural processing unit 100 may be a memory system configured in consideration of the MAC operation characteristics and power consumption characteristics of the processing element array 110.

For example, the neural processing unit 100 may be configured to reduce the number of bits of an operation value of the processing element array 110 in consideration of MAC operation characteristics and power consumption characteristics of the processing element array 110.

The NPU internal memory 120 of the neural processing unit 100 may be configured to minimize power consumption of the neural processing unit 100.

The NPU internal memory 120 of the neural processing unit 100 may be a memory system configured to control the memory with low power in consideration of the data size and operation steps of the artificial neural network model to be operated.

The NPU internal memory 120 of the neural processing unit 100 may be a low-power memory system configured to reuse a specific memory address in which weight data is stored in consideration of the data size and operation steps of the artificial neural network model.

The neural processing unit 100 may provide various activation functions for providing non-linearity. For example, a sigmoid function, a hyperbolic tangent function, or a ReLU function may be provided. The activation function may be selectively applied after the MAC operation. The operation value to which the activation function is applied may be referred to as an activation map.

Figure 3:
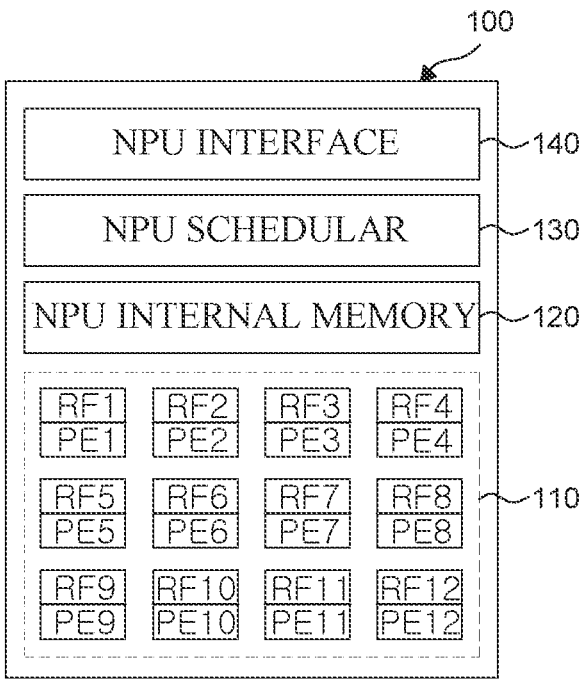
FIG. 3 is an exemplary diagram illustrating a modified embodiment of the neural processing unit 100 of FIG. 1.

FIG. 3 illustrates a modified example of the neural processing unit 100 of FIG. 1.

Since the neural processing unit 100 of FIG. 3 is substantially the same as the neural processing unit 100 exemplarily illustrated in FIG. 1, except for the processing element array 310, hereinafter, redundant description may be omitted for convenience of description.

The processing element array 110 exemplarily illustrated in FIG. 3 is configured to further include a plurality of processing elements PE1 to PE12 and respective register files RF1 to RF12 corresponding to each of the processing elements PE1 to PE12.

The plurality of processing elements PE1 to PE12 and the plurality of register files RF1 to RF12 of FIG. 3 are merely examples for convenience of description, and the number of the plurality of processing elements PE1 to PE12 and the plurality of register files RF1 to RF12 is not limited thereto.

The size or number of the processing element array 110 may be determined by the number of the plurality of processing elements PE1 to PE12 and the plurality of register files RF1 to RF12. The size of the processing element array 110 and the plurality of register files RF1 to RF12 may be implemented in the form of an N×M matrix, where N and M are integers greater than zero.

The array size of the processing element array 110 may be designed in consideration of the characteristics of the artificial neural network model in which the neural processing unit 100 operates. In other words, the memory size of the register file may be determined in consideration of the data size of the artificial neural network model to be operated, the required operating speed, the required power consumption, and the like.

The register files RF1 to RF12 of the neural processing unit 100 are static memory units directly connected to the processing elements PE1 to PE12. The register files RF1 to RF12 may include, for example, flip-flops and/or latches. The register files RF1 to RF12 may be configured to store MAC operation values of the corresponding processing elements RF1 to RF12. The register files RF1 to RF12 may be configured to provide or receive weight data and/or node data to the NPU internal memory 120.

Figure 4:
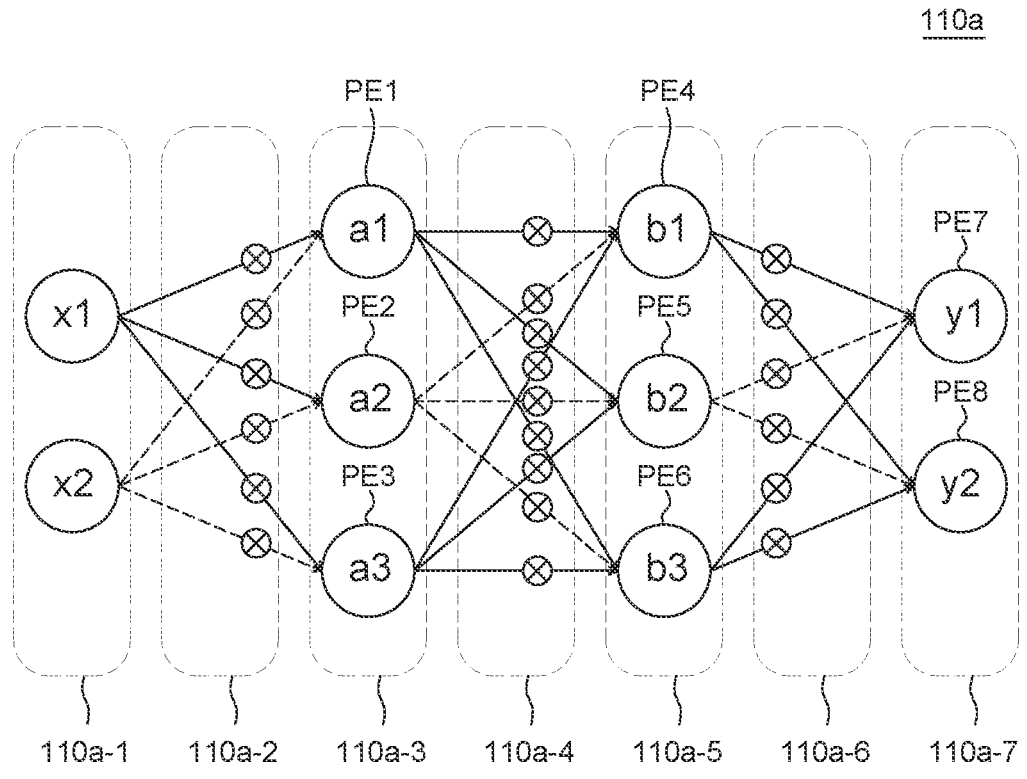
FIG. 4 is a schematic diagram illustrating an exemplary artificial neural network model.

FIG. 4 illustrates an exemplary artificial neural network model.

Hereinafter, the operation of the exemplary artificial neural network model 110a that can be operated in the neural processing unit 100 will be described.

The exemplary artificial neural network model 110a of FIG. 4 may be an artificial neural network trained by the neural processing unit 100 or trained by the device illustrated in FIG. 5A, the device illustrated in FIG. 6A or 6B, or a separate machine learning device. The artificial neural network model 110a may be an artificial neural network trained to perform various inference functions, such as object recognition and voice recognition.

The artificial neural network model 110a may be a deep neural network (DNN).

However, the artificial neural network model 110a according to embodiments of the present disclosure is not limited to a deep neural network.

For example, the artificial neural network model 110a can be implemented as models such as VGG, VGG16, DenseNet and Fully Convolutional Network (FCN) with encoder-decoder structure, Deep Neural Networks (DNN) such as SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and the like. However, the present disclosure is not limited to the above-described models. Also, the artificial neural network model 110a may be an ensemble model based on at least two different models.

The artificial neural network model 110a may be stored in the NPU internal memory 120 of the neural processing unit 100. Alternatively, the artificial neural network model 110a may be implemented in such a way that it is stored in the apparatus 1000 of FIG. 5A or the memory 200 of the apparatus 1000 of FIG. 6A or 6B and then loaded into the neural processing unit 100 when the artificial neural network model 110a is operated.

Hereinafter, a process in which an exemplary artificial neural network model 110a is inferred by the neural processing unit 100 will be described with reference to FIG. 4.

The artificial neural network model 110a is an exemplary deep neural network model configured to include an input layer 110a-1, a first connection network 110a-2, a first hidden layer 110a-3, a second connection network 110a-4, a second hidden layer 110a-5, a third connection network 110a-6, and an output layer 110a-7. However, the present disclosure is not limited to the artificial neural network model illustrated in FIG. 4. The first hidden layer 110a-3 and the second hidden layer 110a-5 may be referred to as a plurality of hidden layers.

The input layer 110a-1 may include, for example, x1 and x2 input nodes. That is, the input layer 110a-1 may include node data including two node values. The NPU scheduler 130 illustrated in FIG. 1 or FIG. 3. may set a memory address in which the input data of the input layer 110a-1 is stored in the NPU internal memory 120 illustrated in FIG. 1 or FIG. 3.

The first connection network 110a-2, may include, for example, connections having weight value including six weight values connecting each node of the input layer 110a-1 and each node of the first hidden layer 110a-3. The NPU scheduler 130 of FIG. 1 or FIG. 3. may set a memory address in which the weight value of the first connection network 110a-2 is stored in the NPU internal memory 120. Each of weight values is multiplied with each of input node value, and an accumulated value of the multiplied values is stored in the first hidden layer 110a-3.

The first hidden layer 110a-3 may include, for example, nodes a1, a2, and a3. That is, the first hidden layer 110a-3 may include node data including three node values. The NPU scheduler 130 of FIG. 1 or FIG. 3 may set a memory address in which the node value of the first hidden layer 110a-3 is stored in the NPU internal memory 120.

The second connection network 110a-4 may include, for example, connections having weight values including nine weight values connecting each node of the first hidden layer 110a-3 and each node of the second hidden layer 110a-5. Each connection network includes respective weight values. The NPU scheduler 130 of FIG. 1 or FIG. 3 may set a memory address in which the weight value of the second connection network 110a-4 is stored in the NPU internal memory 120. The weight value of the second connection network 110a-4 is multiplied by the input node value of the first hidden layer 110a-3, respectively, and the accumulated value of the multiplied values is stored in the second hidden layer 110a-5.

The second hidden layer 110a-5 may include, for example, nodes b1, b2, and b3. That is, the second hidden layer 110a-5 may include information with respect to the three node values. The NPU scheduler 130 may set a memory address for storing information on a node value of the second hidden layer 110a-5 in the NPU internal memory 120.

The third connection network 110a-6 may include, for example, information on six weight values connecting each node of the second hidden layer 110a-5 and each node of the output layer 110a-7. The NPU scheduler 130 may set a memory address for storing the weight value of the third connection network 110a-6 in the NPU internal memory 120. Weight value of the third connection network 110a-6 is multiplied by the input node value of the second hidden layer 110a-5, and the accumulated value of the multiplied values is stored in the output layer 110a-7.

The output layer 110a-7 may include, for example, y1 and y2 nodes. That is, the output layer 110a-7 may include information with respect to the two node values. The NPU scheduler 130 may set a memory address for storing information on the node value of the output layer 110a-7 in the NPU internal memory 120.

That is, the NPU scheduler 130 may analyze or receive the structure of an artificial neural network model to operate in the processing element array 110. The artificial neural network data that the artificial neural network model can include may include node value of each layer, information on the locality information or structure of the layout data of the layers or information on the weight value of each network connecting the nodes of each layer.

As the NPU scheduler 130 is provided with structure data or artificial neural network data locality information of the exemplary neural network model 110a, the NPU scheduler 130 is also capable of analyzing the operation sequence from the input to the output of the artificial neural network model 110a.

Accordingly, the NPU scheduler 130 may set the memory address in which the MAC operation values of each layer are stored in the NPU internal memory 120 in consideration of the scheduling sequence. For example, the specific memory address may be a MAC operation value of the input layer 110a-1 and the first connection network 110a-2, and may be input data of the first hidden layer 110a-3 at the same time. However, the present disclosure is not limited to the MAC operation value, and the MAC operation value may also be referred to as an artificial neural network operation value.

At this time, since the NPU scheduler 130 knows that the MAC operation result of the input layer 110a-1 and the first connection network 110a-2 is the input data of the first hidden layer 110a-3, the same memory address can be used. That is, the NPU scheduler 130 may reuse the MAC operation value based on the artificial neural network model structure data or the artificial neural network data locality information. Therefore, there is an effect that the NPU internal memory 120 can provide a memory reuse function.

That is, the NPU scheduler 130 stores the MAC operation value of the artificial neural network model 110a according to the scheduling sequence in a specific memory address of the NPU internal memory 120, and the specific memory address in which the MAC operation value is stored may be used as input data for the MAC operation of the next scheduling order.

MAC Operation from the Perspective of the First Processing Element PE1

The MAC operation will be described in detail from the perspective of the first processing element PE1. The first processing element PE1 may be designated to perform a MAC operation of the a1 node of the first hidden layer 110a-3.

First, the first processing element PE1 inputs the x1 node value of the input layer 110a-1 to the first input unit and the weight value between the x1 node and the a1 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the first processing element PE1 inputs the x2 node value of the input layer 110a-1 to the first input unit and the weight value between the x2 node and the a1 node to the second input unit of the multiplier 111. The adder 112 adds the operation value of the multiplier 111 and the operation value of the accumulator 113. At this time, when the number of L loops is one, the multiplication value of the x1 node value and the weight between the x1 node and the a1 node calculated in the previous step is stored. Accordingly, the adder 112 generates a MAC operation value of the x1 node and the x2 node corresponding to the a1 node.

Third, the NPU scheduler 130 may terminate the MAC operation of the first processing element PE1 based on the structure data of the artificial neural network model or the artificial neural network data locality information. At this time, the accumulator 113 may be initialized by inputting an initialization reset. That is, the counter value of L loops can be initialized to zero.

The bit quantization unit 114 may be appropriately controlled according to the accumulated value. In more detail, as the number of L loops increases, the number of bits of an output value increases. At this time, the NPU scheduler 130 may remove a predetermined lower bit so that the number of bits of the operation value of the first processing element PE1 becomes X bits.

MAC Operation from the Perspective of the Second Processing Element PE2

The MAC operation will be described in detail in terms of the second processing element PE2. The second processing element PE2 may be designated to perform a MAC operation of the a2 node of the first hidden layer 110a-3.

First, the second processing element PE2 inputs the x1 node value of the input layer 110a-1 to the first input unit and the weight value between the x1 node and the a2 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the second processing element PE2 inputs the x2 node value of the input layer 110a-1 to the first input unit and the weight value between the x2 node and the a2 node to the second input unit of the multiplier 111. The adder 112 adds the operation value of the multiplier 111 and the operation value of the accumulator 113. At this time, when the number of L loops is one, the multiplication value of the x1 node value and the weight between the x1 node and the a2 node calculated in the previous step is stored. Accordingly, the adder 112 generates a MAC operation value of the x1 node and the x2 node corresponding to the a2 node.

Third, the NPU scheduler 130 may terminate the MAC operation of the second processing element PE2 based on the structure data of the artificial neural network model or the artificial neural network data locality information. At this time, the accumulator 113 may be initialized by inputting an initialization reset. That is, the counter value of L loops can be initialized to zero. The bit quantization unit 114 may be appropriately controlled according to the accumulated value. MAC Operation from the Perspective of the Third Processing Element PE3

The MAC operation will be described in detail in terms of the third processing element PE3. The third processing element PE3 may be designated to perform the MAC operation of the a3 node of the first hidden layer 110a-3.

First, the third processing element PE3 inputs the x1 node value of the input layer 110a-1 to the first input unit and the weight value between the x1 node and the a3 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the third processing element PE3 inputs the x2 node value of the input layer 110a-1 to the first input unit and the weight value between the x2 node and the a3 node to the second input unit of the multiplier 111. The adder 112 adds the operation value of the multiplier 111 and the operation value of the accumulator 113. At this time, when the number of L loops is one, the multiplication value of the x1 node value and the weight between the x1 node and the a3 node calculated in the previous step is stored. Accordingly, the adder 112 generates a MAC operation value of the x1 node and the x2 node corresponding to the a3 node.

Third, the NPU scheduler 130 may terminate the MAC operation of the third processing element PE3 based on the structure data of the artificial neural network model or the artificial neural network data locality information. At this time, the accumulator 113 may be initialized by inputting an initialization reset. That is, the counter value of L loops can be initialized to zero. The bit quantization unit 114 may be appropriately controlled according to the accumulated value.

Accordingly, the NPU scheduler 130 of the neural processing unit 100 may perform the MAC operations of the first hidden layer 110a-3 using the three processing elements PE1 to PE3 at the same time.
MAC Operation from the Perspective of the Fourth Processing Element PE4

The MAC operation will be described in detail in terms of the fourth processing element PE4. The fourth processing element PE4 may be designated to perform a MAC operation of the b1 node of the second hidden layer 110a-5.

First, the fourth processing element PE4 inputs the a1 node value of the first hidden layer 110a-3 to the first input unit and the weight value between the a1 node and the b1 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the fourth processing element PE4 inputs the a2 node value of the first hidden layer 110a-3 to the first input unit and the weight value between the a2 node and the b1 node to the second input unit of the multiplier 111. The adder 112 adds the operation value of the multiplier 111 and the operation value of the accumulator 113. At this time, when the number of L loops is one, the multiplication value of the a1 node value and the weight between the a1 node and the b1 node calculated in the previous step is stored. Accordingly, the adder 112 generates a MAC operation value of the a1 node and the a2 node corresponding to the b1 node. In this case, the counter value of L loops can be two.

Third, the fourth processing element PE4 inputs the a3 node value of the input layer 110a-1 to the first input unit and the weight value between the a3 node and the b1 node to the second input unit of the multiplier 111. The adder 112 adds the operation value of the multiplier 111 and the operation value of the accumulator 113. At this time, when the number of L loops is two, the MAC operation value of the a1 node and the a2 node corresponding to the b1 node calculated in the previous step is stored. Accordingly, the adder 112 generates a MAC operation value of the a1 node, the a2 node, and the a3 node corresponding to the b1 node.

Fourth, the NPU scheduler 130 may terminate the MAC operation of the fourth processing element PE4 based on the structure data of the artificial neural network model or the artificial neural network data locality information. At this time, the accumulator 113 may be initialized by inputting an initialization reset. That is, the counter value of L loops can be initialized to zero. The bit quantization unit 114 may be appropriately controlled according to the accumulated value. MAC Operation from the Perspective of the Fifth Processing Element PE5

The MAC operation will be described in detail in terms of the fifth processing element PE5. The fifth processing element PE5 may be designated to perform a MAC operation of the b2 node of the second hidden layer 110a-5.

First, the fifth processing element PE5 inputs the a1 node value of the first hidden layer 110a-3 to the first input unit and the weight value between the a1 node and the b2 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the fifth processing element PE5 inputs the a2 node value of the first hidden layer 110a-3 to the first input unit and the weight value between the a2 node and the b2 node to the second input unit of the multiplier 111. The adder 112 adds the operation value of the multiplier 111 and the operation value of the accumulator 113. At this time, when the number of L loops is one, the multiplication value of the a1 node value and the weight between the a1 node and the b2 node calculated in the previous step is stored. Accordingly, the adder 112 generates a MAC operation value of the a1 node and the a2 node corresponding to the b2 node. In this case, the counter value of L loops can be two.

Third, the fifth processing element PE5 inputs the a3 node value of the first hidden layer 110*a*-3 to the first input unit and the weight value between the a3 node and the b2 node to the second input unit of the multiplier 111. The adder 112 adds the operation value of the multiplier 111 and the operation value of the accumulator 113. At this time, when the number of L loops is two, the MAC operation value of the a1 node and the a2 node corresponding to the b2 node calculated in the previous step is stored. Accordingly, the adder 112 generates a MAC operation value of the a1 node, the a2 node, and the a3 node corresponding to the b2 node.

Fourth, the NPU scheduler 130 may terminate the MAC operation of the fifth processing element PE5 based on the structure data of the artificial neural network model or the artificial neural network data locality information. At this time, the accumulator 113 may be initialized by inputting an initialization reset. That is, the counter value of L loops can be initialized to zero. The bit quantization unit 114 may be appropriately controlled according to the accumulated value.
MAC Operation from the Perspective of the Sixth Processing Element PE6

The MAC operation will be described in detail in terms of the sixth processing element PE6. The sixth processing element PE6 may be designated to perform a MAC operation of the b3 node of the second hidden layer 110*a*-5.

First, the sixth processing element PE6 inputs the a1 node value of the first hidden layer 110*a*-3 to the first input unit and the weight value between the a1 node and the b3 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the sixth processing element PE6 inputs the a2 node value of the first hidden layer 110*a*-3 to the first input unit and the weight value between the a2 node and the b3 node to the second input unit of the multiplier 111. The adder 112 adds the operation value of the multiplier 111 and the operation value of the accumulator 113. At this time, when the number of L loops is one, the multiplication value of the a1 node value and the weight between the a1 node and the b3 node calculated in the previous step is stored. Accordingly, the adder 112 generates a MAC operation value of the a1 node and the a2 node corresponding to the b3 node. In this case, the counter value of L loops can be two.

Third, the sixth processing element PE6 inputs the a3 node value of the first hidden layer 110*a*-3 to the first input unit and the weight value between the a3 node and the b3 node to the second input unit of the multiplier 111. The adder 112 adds the operation value of the multiplier 111 and the operation value of the accumulator 113. At this time, when the number of L loops is two, the MAC operation value of the a1 node and the a2 node corresponding to the b3 node calculated in the previous step is stored. Accordingly, the adder 112 generates a MAC operation value of the a1 node, the a2 node, and the a3 node corresponding to the b3 node.

Fourth, the NPU scheduler 130 may terminate the MAC operation of the sixth processing element PE6 based on the structure data of the artificial neural network model or the artificial neural network data locality information. At this time, the accumulator 113 may be initialized by inputting an initialization reset. That is, the counter value of L loops can be initialized to zero. The bit quantization unit 114 may be appropriately controlled according to the accumulated value.

Accordingly, the NPU scheduler 130 of the neural processing unit 100 may perform the MAC operations of the second hidden layer 110*a*-5 using the three processing elements PE4 to PE6 at the same time.
MAC Operation from the Perspective of the Seventh Processing Element PE7

The MAC operation will be described in detail in terms of the seventh processing element PE7. The seventh processing element PE7 may be designated to perform a MAC operation of the y1 node of the output layer 110*a*-7.

First, the seventh processing element PE7 inputs the b1 node value of the second hidden layer 110*a*-5 to the first input unit and the weight value between the b1 node and the y1 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the seventh processing element PE7 inputs the b2 node value of the second hidden layer 110*a*-5 to the first input unit and the weight value between the b2 node and the y1 node to the second input unit of the multiplier 111. The adder 112 adds the operation value of the multiplier 111 and the operation value of the accumulator 113. At this time, when the number of L loops is one, the multiplication value of the b1 node value and the weight between the b1 node and the y1 node calculated in the previous step is stored. Accordingly, the adder 112 generates a MAC operation value of the b1 node and the b2 node corresponding to the y1 node. In this case, the counter value of L loops can be two.

Third, the seventh processing element PE7 inputs the b3 node value of the second hidden layer 110*a*-5 to the first input unit and the weight value between the b3 node and the y1 node to the second input unit of the multiplier 111. The adder 112 adds the operation value of the multiplier 111 and the operation value of the accumulator 113. At this time, when the number of L loops is two, the MAC operation value of the b1 node and the b2 node corresponding to the y1 node calculated in the previous step is stored. Accordingly, the adder 112 generates a MAC operation value of the b1 node, the b2 node, and the b3 node corresponding to the y1 node.

Fourth, the NPU scheduler 130 may terminate the MAC operation of the seventh processing element PE7 based on the structure data of the artificial neural network model or the artificial neural network data locality information. At this time, the accumulator 113 may be initialized by inputting an initialization reset. That is, the counter value of L loops can be initialized to zero. The bit quantization unit 114 may be appropriately controlled according to the accumulated value.
MAC Operation from the Perspective of the Eighth Processing Element PE8

The MAC operation will be described in detail in terms of the eighth processing element PE8. The eighth processing element PE8 may be designated to perform a MAC operation of the y2 node of the output layer 110*a*-7.

First, the eighth processing element PE8 inputs the b1 node value of the second hidden layer 110a-5 to the first input unit and the weight value between the b1 node and the y2 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the eighth processing element PE8 inputs the b2 node value of the second hidden layer 110a-5 to the first input unit and the weight value between the b2 node and the y2 node to the second input unit of the multiplier 111. The adder 112 adds the operation value of the multiplier 111 and the operation value of the accumulator 113. At this time, when the number of L loops is one, the multiplication value of the b1 node value and the weight between the b1 node and the y2 node calculated in the previous step is stored. Accordingly, the adder 112 generates a MAC operation value of the b1 node and the b2 node corresponding to the y2 node. In this case, the counter value of L loops can be two.

Third, the eighth processing element PE8 inputs the b3 node value of the second hidden layer 110a-5 to the first input unit and the weight value between the b3 node and the y2 node to the second input unit of the multiplier 111. The adder 112 adds the operation value of the multiplier 111 and the operation value of the accumulator 113. At this time, when the number of L loops is two, the MAC operation value of the b1 node and the b2 node corresponding to the y2 node calculated in the previous step is stored. Accordingly, the adder 112 generates a MAC operation value of the b1 node, the b2 node, and the b3 node corresponding to the y2 node.

Fourth, the NPU scheduler 130 may terminate the MAC operation of the eighth processing element PE8 based on the structure data of the artificial neural network model or the artificial neural network data locality information. At this time, the accumulator 113 may be initialized by inputting an initialization reset. That is, the counter value of L loops can be initialized to zero. The bit quantization unit 114 may be appropriately controlled according to the accumulated value.

Accordingly, the NPU scheduler 130 of the neural processing unit 100 may perform the MAC operations of the output layer 110a-7 using the two processing elements PE7 to PE8 at the same time.

When the MAC operation of the eighth processing element PE8 is finished, the inference operation of the artificial neural network model 110a may be completed. That is, it may be determined that the artificial neural network model 110a has completed the inference operation of one frame. If the neural processing unit 100 infers video data in real time, image data of the next frame may be input to the x1 and x2 input nodes of the input layer 110a-1. In this case, the NPU scheduler 130 may store the image data of the next frame in the memory address storing the input data of the input layer 110a-1. If this process is repeated for each frame, the neural processing unit 100 may process the inference operation in real time. Also, there is an effect that a preset memory address can be reused.

Summarizing the case of the artificial neural network model 110a of FIG. 4, the NPU scheduler 130 of the neural processing unit 100 may determine the operation scheduling sequence based on the artificial neural network model 110a structure data or the artificial neural network data locality information for the inference operation of the artificial neural network model 110a. The NPU scheduler 130 may set a memory address required for the NPU internal memory 120 based on the operation scheduling sequence. The NPU scheduler 130 may set a memory address for reusing the memory, based on the structure data or the artificial neural network data locality information of the neural network model 110a. The NPU scheduler 130 may perform an inference operation by designating the processing elements PE1 to PE8 required for the inference operation.

In addition, if the number of the weight data connected to one node increases by L, the number of L loops of the accumulator of the processing element may be set to L−1. That is, even if the number of the weight data of the artificial neural network increases, the accumulator has the effect of easily performing an inference operation by increasing the number of accumulations of the accumulator.

That is, the NPU scheduler 130 of the neural processing unit 100 according to an embodiment of the present disclosure may control the processing element array 100 and the NPU internal memory 120 based on the structure data including structure data of an input layer 110a-1, a first connection network 110a-2, a first hidden layer 110a-3, a second connection network 110a-4, a second hidden layer 110a-5, a third connection network 110a-6, and an output layer 110a-7 or the artificial neural network data locality information of an artificial neural network model.

That is, the NPU scheduler 130 may set memory address values corresponding to node data of the input layer 110a-1, weight data of the first connection network 110a-2, node data of the first hidden layer 110a-3, weight data of the second connection network 110a-4, node data of the second hidden layer 110a-5, weight data of the third connection network 110a-6, and node data of the output layer 110a-7 in the NPU internal memory 120.

Hereinafter, the scheduling of the NPU scheduler 130 will be described in detail. The NPU scheduler 130 may schedule the operation sequence of the artificial neural network model based on the artificial neural network model structure data or the artificial neural network data locality information.

The NPU scheduler 130 may obtain a memory address value in which node data of a layer and weight data of a connection network of an artificial neural network model are stored on the basis of the artificial neural network model structure data or the artificial neural network data locality information.

For example, the NPU scheduler 130 may obtain a memory address value in which node data of a layer and weight data of a connection network of an artificial neural network model are stored in the main memory. Therefore, the NPU scheduler 130 may bring the node data of the layer and the weight data of the connection network of the artificial neural network model to be driven from the main memory and store it in the NPU internal memory 120. Node data of each layer may have a corresponding respective memory address value. Weight data of each connection network may have a corresponding respective memory address value.

The NPU scheduler 130 may schedule an operation sequence of the processing element array 110 based on the structure data of an artificial neural network model or artificial neural network data locality information, for example, arrangement structure data of the layers of the artificial neural network of the artificial neural network model or the artificial neural network data locality information, constructed at the time of compilation.

For example, the NPU scheduler 130 may obtain weight data having weight values of four artificial neural network layers and three layers connecting each layer, that is, the network connection data. In this case, a method of scheduling the processing sequence by the NPU scheduler 130 based on the structure data of the neural network model or the artificial neural network data locality information will be described below with an example.

For example, the NPU scheduler 130 sets the input data for the inference operation to the node data of the first layer, which is the input layer 110a-1 of the artificial neural network model 110a, and may schedule to perform the MAC operation of the node data of the first layer and the weight data of the first connection network corresponding to the first layer at first. Hereinafter, for convenience of description, a corresponding operation may be referred to as a first operation, a result of the first operation may be referred to as a first operation value, and a corresponding scheduling may be referred to as a first scheduling.

For example, the NPU scheduler 130 sets the first operation value to the node data of the second layer corresponding to the first connection network, and may schedule the MAC operation of the node data of the second layer and the weight data of the second connection network corresponding to the second layer to be performed after the first scheduling. Hereinafter, for convenience of description, a corresponding operation may be referred to as a second operation, a result of the second operation may be referred to as a second operation value, and a corresponding scheduling may be referred to as a second scheduling.

For example, the NPU scheduler 130 sets the second operation value to the node data of the third layer corresponding to the second connection network, and may schedule the MAC operation of the node data of the third layer and the weight data of the third connection network corresponding to the third layer to be performed in the second scheduling. Hereinafter, for convenience of description, a corresponding operation may be referred to as a third operation, a result of the third operation may be referred to as a third operation value, and a corresponding scheduling may be referred to as a third scheduling.

For example, the NPU scheduler 130 sets the third operation value to the node data of the fourth layer, which is the output layer 1370, corresponding to the third connection network, and may schedule to store the inference result stored in the node data of the fourth layer in the NPU internal memory 120. Hereinafter, for convenience of description, the corresponding scheduling may be referred to as a fourth scheduling. The inference result value may be transmitted and utilized to various elements of the apparatus 1000.

For example, if the inference result value is a result value of detecting a specific keyword, the neural processing unit 100 transmits the inference result to the central processing unit so that the apparatus 1000 can perform an operation corresponding to the specific keyword.

For example, the NPU scheduler 130 may drive the first to third processing elements PE1 to PE3 in the first scheduling.

For example, the NPU scheduler 130 may drive the fourth to sixth processing elements PE4 to PE6 in the second scheduling.

For example, the NPU scheduler 130 may drive the seventh to eighth processing elements PE7 to PE8 in the third scheduling.

For example, the NPU scheduler 130 may output an inference result in the fourth scheduling.

In summary, the NPU scheduler 130 may control the NPU internal memory 120 and the processing element array 110 so that the operation is performed in the first scheduling, the second scheduling, the third scheduling, and the fourth scheduling sequence. That is, the NPU scheduler 130 may be configured to control the NPU internal memory 120 and the processing element array 110 so that operations are performed in a set scheduling sequence.

In summary, the neural processing unit 100 according to an embodiment of the present disclosure may be configured to schedule a processing sequence based on a structure of layers of an artificial neural network and operation sequence data corresponding to the structure. The scheduled processing order may include at least one operation. For example, since the neural processing unit 100 can predict the sequence of all operations, it is also possible to schedule the subsequent operation, and it is also possible to schedule the operation in a particular sequence.

The NPU scheduler 130 has the effect of improving the memory reuse rate by controlling the NPU internal memory 120 by utilizing the scheduling sequence based on the artificial neural network model structure data or the artificial neural network data locality information.

Due to the nature of the artificial neural network operation driven by the neural processing unit 100 according to an embodiment of the present disclosure, the operation value of one layer may have a characteristic that becomes input data of the next layer.

Accordingly, when the neural processing unit 100 controls the NPU internal memory 120 according to the scheduling sequence, there is an effect that can improve the memory reuse rate of the NPU internal memory 120.

Specifically, if the NPU scheduler 130 is configured to receive structure data or artificial neural network data locality information of an artificial neural network model, and the sequence in which the computation of the artificial neural network is performed can be determined based on the provided artificial neural network model structure data or the artificial neural network data locality information, the NPU scheduler 130 may determine that the operation result of the node data of a specific layer and the weight data of the specific connection network of the artificial neural network model becomes the node data of the successive layer. Therefore, the NPU scheduler 130 may reuse the value of the memory address in which the operation result is stored in the subsequent operation.

For example, the first operation value of the above-described first scheduling is set as node data of the second layer of the second scheduling. Specifically, the NPU scheduler 130 may reset the memory address value corresponding to the first operation value of the first scheduling stored in the NPU internal memory 120 to a memory address value corresponding to the node data of the second layer of the second scheduling. That is, the memory address value can be reused. Therefore, by reusing the memory address value of the first scheduling by the NPU scheduler 130, there is an effect that the NPU internal memory 120 can employ the second layer node data of the second scheduling without a separate memory write operation.

For example, the second operation value of the above-described second scheduling is set as node data of the third layer of the third scheduling. Specifically, the NPU scheduler 130 may reset the memory address value corresponding to the second operation value of the second scheduling stored in the NPU internal memory 120 to a memory address value corresponding to the node data of the third layer of the third scheduling. That is, the memory address value can be reused. Therefore, by reusing the memory address value of the second scheduling by the NPU scheduler 130, there is an effect that the NPU internal memory 120 can employ the third layer node data of the third scheduling without a separate memory write operation.

For example, the third operation value of the above-described third scheduling is set as node data of the fourth layer of the fourth scheduling. Specifically, the NPU scheduler 130 may reset the memory address value corresponding to the third operation value of the third scheduling stored in the NPU internal memory 120 to a memory address value corresponding to the node data of the fourth layer of the fourth scheduling. That is, the memory address value can be reused. Therefore, by reusing the memory address value of the third scheduling by the NPU scheduler 130, there is an effect that the NPU internal memory 120 can employ the fourth layer node data of the fourth scheduling without a separate memory write operation.

Furthermore, it is also possible that the NPU scheduler 130 is configured to control the NPU internal memory 120 by determining the scheduling sequence and whether memory is reused or not. In this case, there is an effect that the NPU scheduler 130 can provide optimized scheduling by analyzing the artificial neural network model structure data or the artificial neural network data locality information. In addition, there is an effect that can reduce memory usage because the data required for memory reusable operation may not be duplicated and stored in the NPU internal memory 120. In addition, the NPU scheduler 130 has the effect of optimizing the NPU internal memory 120 by calculating the memory usage reduced by the memory reuse.

The neural processing unit 100 according to an embodiment of the present disclosure, the first processing element PE1 may be configured such that a first input having an N-bit input receives a variable value and a second input having an M-bit input receives a constant value. Also, such a configuration may be identically set for other processing elements of the processing element array 110. That is, one input of the processing element may be configured to receive a variable value and the other input to receive a constant value. Accordingly, there is an effect that the number of times of data update of the constant value can be reduced.

At this time, the NPU scheduler 130 utilizes the structure data or the data locality information of the artificial neural network model 100A, and may set the node data of the input layer 110a-1, the first hidden layer 110a-2, the second hidden layer 110a-3, and the output layer 110a-4 as variables, and the weight data of the first connection network 110a-1, the weight data of the second connection network 110a-2, and the weight data of the third connection network 110a-3 as constants. That is, the NPU scheduler 130 may distinguish a constant value from a variable value. However, the present disclosure is not limited to constant and variable data types, and in essence, it is possible to improve the reuse rate of the NPU internal memory 120 by distinguishing a value that is frequently changed and a value that is not.

That is, the NPU internal memory 120 may be configured to preserve the weight data of the connections stored in the NPU internal memory 120 while the inference operation of the neural processing unit 100 continues. Accordingly, there is an effect of reducing memory read/write operations.

That is, the NPU internal memory 120 may be configured to reuse the MAC operation value stored in the NPU internal memory 120 while the inference operation is continued.

That is, the frequency of data update of the memory address in which the N-bit input data of the first input are stored may be greater than the frequency of data update of the memory address in which the M-bit input data of the second input unit are stored of each processing element of the processing element array 110. That is, there is an effect that the frequency of data updates of the second input unit may be less than the frequency of data updates of the first input unit.

FIG. 5A illustrates an artificial neural network (ANN) driving apparatus including the neural processing unit 100 of FIG. 1 or FIG. 3, and FIG. 5B shows the energy consumed during operation of the neural processing unit 100.

Referring to FIG. 5A, the ANN driving apparatus 1000 may include a neural processing unit 100, a memory 200, a kernel generator 300, and a substrate 400.

An electrically conductive pattern may be formed on the substrate 400. Also, the neural processing unit 100, the memory 200, and the kernel generator 300 may be coupled to the substrate 400 to be electrically connected to the electrically conductive pattern. The electrically conductive pattern may operate as a system bus allowing the neural processing unit 100, the memory 200, and the kernel generator 300 to communicate.

The neural processing unit 100 may include the elements illustrated in FIG. 1 or FIG. 3.

The memory 200 is a device for storing data under the control of a host device such as a computer or a smart phone. The memory 200 may include a volatile memory and a non-volatile memory.

The volatile memory device may be a memory device that stores data only when power is supplied and loses stored data when power supply is cut-off. The volatile memory may include a static random-access memory (SRAM), a dynamic random access memory (DRAM), and the like.

The memory 200 may include a solid state drive (SSD), a flash memory, a magnetic random access memory (MRAM), a phase change RAM (PRAM), a ferroelectric RAM (FeRAM), a hard disk, a flash memory, a synchronous random access memory (SRAM), a dynamic random access memory (DRAM), and the like.

Convolutional Neural Network (CNN), which is a type of Deep Neural Network (DNN) among artificial neural networks, will be mainly explained.

The convolutional neural network may be a combination of one or several convolutional layers, a pooling layer, and fully connected layers. The convolutional neural network has a structure suitable for learning and inferencing of two-dimensional data, and can be trained through a back-propagation algorithm.

In the example of the present disclosure, a kernel for extracting a feature of an input image of a channel exists for each channel of the convolutional neural network. The kernel may be composed of a two-dimensional matrix. The kernel performs convolution operation while traversing the input data. The size of the kernel may be arbitrarily determined, and the stride at which the kernel traverses the input data may also be arbitrarily determined. The degree of matching of the kernel to all input data per one kernel may be a feature map or an activation map.

Since the convolution operation is an operation consisting of a combination of input data and a kernel, an activation function such as ReLU for adding nonlinearity may be applied thereafter. When an activation function is applied to a feature map that is a result of a convolution operation, it may be referred to as an activation map.

Convolutional neural networks may include Alexnet, Squeezenet, VGG16, Resnet152, Moblienet, and the like. The number of multiplications required for one inference in each neural network model is 727 MFLOPs, 837 MFLOPs, 16 MFLOPs, 11 MFLOPs, 11 MFLOPs, and 579 MFLOPs, respectively, and the data size of all weights including the kernel is 233 MB, 5 MB, 528 MB, 230 MB, 16 M, respectively. So, it can be seen that a fairly large amount of hardware resources and power consumption are required.

Conventionally, these kernels are stored in the memory for each corresponding channel, and the input data is processed by reading them from the memory for each convolution process. For example, as illustrated in FIG. 5B, for 32-bit data read operation during the convolutional operation, the NPU internal memory 120 of the neural processing unit 100 which is a SRAM may consume 5 pj of energy and memory 200 which is a DRAM may consume 640 pj. Compared memory to other operations that consume 0.03 pj in 8-bit addition operation, 0.05 pj in 16-bit addition, 0.1 pj in 32-bit addition, and 0.2 pj in 8-bit multiplication. That is, memory consumes considerably more power and causes overall performance degradation. That is, the power consumed when reading the kernel from the memory 200 is 128 times greater than the power consumed when reading the kernel from the internal memory of the neural processing unit 100.

That is, the operating speed of the memory 200 is slower than that of the neural processing unit 100, but the power consumption per unit operation is relatively large. Therefore, minimizing the read operation of the memory 200 may affect the reduction in power consumption of the apparatus 1000.

To overcome this inefficiency, the present disclosure discloses a method and system for generating an artificial neural network kernel having improved computational performance by minimizing data movement that calls a kernel from the memory 200 in every convolution process to reduce overall hardware resources and power consumption due to data movement.

Specifically, the memory 200 may include a base kernel storage unit 210, a kernel filter storage unit 220, and a kernel generation algorithm storage unit 230.

According to an example of the present disclosure, a plurality of kernels may be generated according to a rule determined according to a kernel generation algorithm (or a kernel restoration algorithm) based on a base kernel.

The memory 200 may set the base kernel storage 210 in which the base kernel is stored, the kernel filter storage 220 in which the kernel filter is stored, and the kernel generation algorithm storage 230 by allocating the areas. The base kernel storage 210, the kernel filter storage 220, and the kernel generation algorithm storage 230 may be configured by setting a memory address of the memory 200. However, the present disclosure is not limited thereto.

FIG. 5A shows that the base kernel storage 210, the kernel filter storage 220, and the kernel generation algorithm storage 230 are stored in the memory 200. However, it may be stored in the NPU internal memory 120 included in the neural processing unit 100 according to an example. Furthermore, although the kernel generator 300 is illustrated as being independent of the neural processing unit 100, the kernel generator 300 may be located in the neural processing unit 100 as illustrated in FIG. 6A.

The base kernel storage 210 may store a base kernel that is a basis for kernel generation. The base kernel may be a base kernel that is based on generating a kernel of another layer, a channel of another layer, and/or another channel of the same layer. The base kernel is not necessarily singular, and according to an example, a plurality of base kernels may exist. Each base kernel may have a different weight value.

The base kernel may be applied in units of channels or layers. For example, each base kernel may be applied in units of RGB channels in a color image pg., and a feature map may be generated from the base kernel applied to each channel to each channel. For example, a kernel of another layer may be generated based on the base kernel.

That is, a kernel for calculating a feature map of another channel may be generated from the base kernel. Accordingly, the ANN driving apparatus 1000 may select an appropriate weight according to a kernel generation algorithm (or a kernel restoration algorithm) for generating a kernel corresponding to each channel and/or layer and assign it as the base kernel. The base kernel may be determined with reference to a kernel filter to be described later.

For example, the ANN driving apparatus 1000 may determine, as the base kernel, a kernel including a weight having statistically the highest inference accuracy through a learning process.

For example, an arbitrary kernel having a weight, at which the average value of the weight difference values between the kernels for a plurality of channels and/or layers is the minimum, may be set as the base kernel.

However, present disclosure is not limited to the examples described above, and the base kernel may be determined according to various algorithms.

The kernel filter storage 220 may store a kernel filter generated based on a difference value, that is, a delta A value, between the base kernel and other kernels.

In the case of a convolutional neural network that has been trained, a number of finalized kernels are stored. The ANN driving apparatus 1000 selects at least some of the plurality of kernels as the base kernel. In addition, the kernels that are not selected as the base kernel in a plurality of kernels may be converted into a kernel filter corresponding to the base kernel then stored. That is, if a kernel filter is applied to the base kernel, the original kernel may be restored or a kernel similar to the original kernel may be generated. The restored kernel in this way may be referred to as a modified kernel or an updated kernel. That is, the original kernel may be separated into a base kernel and a kernel filter.

The kernel generator 300 may read the base kernel, kernel filters, and kernel generation algorithms (including mapping information) from the memory 200 and store it in the internal memory 310, and then restore the original kernel or generate a kernel similar to the original kernel, and then transmit it to the neural processing unit 100. Once the base kernel, kernel filter, and mapping information are stored in the internal memory of the kernel generator 300, the kernel generator 300 may not need to access the memory 200 again. As such, by accessing the internal memory 310 instead of accessing the memory 200, power consumption can be saved up to 128 times.

The ANN driving apparatus 1000 may restore original kernels required for each layer or channel of the artificial neural network or generate a kernel similar to the original kernel by selectively reflecting the base kernel and the kernel filter by the kernel generator 300. As such, by storing only the reference base kernel and the kernel filter rather than storing all kernels corresponding to each layer or each channel in the memory 200, it is possible to have improved memory efficiency compared to storing all kernels.

As a specific example, the weight value included in the first kernel for the first layer (or first channel) may be eight, and the weight value included in the second kernel for the second layer (or second channel) may be seven. In order to store the first kernel for the first layer (or the first channel) and the second kernel for the second layer (or the second channel), a memory amount of 4 bits may be required, respectively.

According to the example of the present disclosure, the difference value (i.e., Δ value) between the weight value eight and the weight value seven is one. Thus, only one bit of memory may be needed to store the difference value of one.

FIG. 6A illustrates a modified configuration of an ANN driving apparatus including the neural processing unit 100 of FIG. 1 or FIG. 3.

Referring to FIG. 6A, the ANN driving apparatus 1000 may include a neural processing unit 100, a memory 200, a kernel generator 300, and a substrate 400.

An electrically conductive pattern may be formed on the substrate 400. In addition, the neural processing unit 100 and the memory 200 may be coupled to the substrate 400 to be electrically connected to the electrically conductive pattern. The electrically conductive pattern may act as a system bus allowing the neural processing unit 100 and the memory 200 to communicate with each other.

The memory 200 may include a base kernel storage 210, a kernel filter storage 220, and a kernel generation algorithm storage 230. The neural processing unit 100 may further include a kernel generator 150 in addition to the elements illustrated in FIG. 1 or FIG. 3. In FIG. 5A, the kernel generator 300 is illustrated to be disposed outside the neural processing unit 100, but in FIG. 6A, the kernel generator 150 is illustrated to be disposed in the neural processing unit 100.

The kernel generator 150 may generate (restore) an original kernel for a corresponding layer or channel based on the base kernel and the kernel filter stored in the memory 200 according to the kernel generation algorithm (or kernel restoration algorithm).

FIG. 6B illustrates a modified configuration of an ANN driving apparatus including the neural processing unit 100 of FIG. 1 or FIG. 3.

Referring to FIG. 6B, the ANN driving apparatus 1000 may include a neural processing unit 100, a memory 200, a kernel generator 300, and a substrate 400.

An electrically conductive pattern may be formed on the substrate 400. In addition, the neural processing unit 100 and the memory 200 may be coupled to the substrate 400 to be electrically connected to the electrically conductive pattern. The electrically conductive pattern may act as a system bus allowing the neural processing unit 100 and the memory 200 to communicate with each other.

The memory 200 may include a base kernel storage 210, a kernel filter storage 220, a kernel generation algorithm storage 230, and a kernel generator 240.

In FIG. 6A, the kernel generator 150 is illustrated to be disposed in the neural processing unit 100, but in FIG. 6B, the kernel generator 240 is illustrated to be disposed in the memory 200.

That is, if the operating speed of the memory 200 is as high as that of the neural processing unit 100, and has a built-in calculation function with improved power consumption per unit operation which is extremely small, then the memory 200 may include the kernel generator 240.

Hereinafter, the kernel generation algorithm storage 230 of FIGS. 5A, 6A and 6B will be described in detail.

The kernel generation algorithm (or kernel restoration algorithm) may include mapping information between the base kernel, a corresponding kernel filter, and a restoration (modulation) kernel. This will be described later with reference to FIG. 18.

The kernel generation algorithm (or kernel restoration algorithm) may be an algorithm that promises a method of minimizing the size of the kernel filter, i.e., the data size, through a learning process.

The kernel generation algorithm (or kernel restoration algorithm) may be generated according to an algorithm determined to have optimum accuracy through a series of learning processes.

The kernel generation algorithm (or kernel restoration algorithm) may include at least a portion of kernels (i.e., matrices containing weight values) used in the artificial neural network, the number of channels, the number of layers, input data information, an arithmetic processing method, and an order of fetching the kernel from the memory 200. In particular, the kernel generation algorithm (or kernel restoration algorithm) may indicate a method of generating (or restoring) a kernel of a specific layer.

At least one base kernel may be used to create a kernel filter. The base kernel is not necessarily a kernel of the first layer, and a kernel of an arbitrary layer or a kernel of an arbitrary channel may be determined as the base kernel.

The kernel generator 300 may generate a kernel filter for another layer by applying the base kernel in units of layers, and using the kernel of the reference layer as the base kernel. Also, in one layer, only at least one kernel may be determined as the base kernel on a per channel basis, and a kernel filter may be generated based on the base kernel.

In an example, there may be a case where input data consists of only three channels of RGB, as well as a case where dozens or more channels are used. The kernel generator 300 may generate a kernel filter according to various techniques based on a different base kernel for each channel.

Furthermore, various techniques for generating another kernel using the base kernel may be applied differently for each layer or for each channel. Specifically, a technique for generating another kernel using the base kernel may include one of a first method of using the base kernel as it is for another layer or channel, a second method using a kernel filter, a third method of modifying the base kernel itself regardless of the kernel filter, a fourth method of simultaneously modifying the kernel filter and the base kernel, and the like.

In particular, the third method, that is, the method of modifying the base kernel itself, may be implemented through a method of changing the order of retrieving data from the memory 200. Data stored in the memory 200 may be expressed as an address indicating its location. For example, in the memory 200, a location may be expressed by a column address and a row address. The artificial neural network may change the order of receiving each data value of the base kernel by transmitting the changed address to the memory 200 according to the kernel generation algorithm (or the kernel restoration algorithm).

For example, the kernel generation algorithm (or kernel restoration algorithm) may instruct: the first layer (or first channel) to use the base kernel as it is, the kernel corresponding to the second layer (or second channel) to fourth layer (or fourth channel) to be generated by rotating the base kernel, the kernel corresponding to the fifth layer (or fifth channel) to be generated by transposing the base kernel, the kernel corresponding to the sixth layer (or sixth channel) to eighth layer (or eighth channel) to be generated by adding or subtracting a kernel filter to the base kernel, and the kernel corresponding to the ninth layer to rotate while multiplying the kernel filter.

In particular, the third method of modifying the base kernel itself may be effective in training a convolutional neural network for object recognition. For example, if rotation and transpose are applied, it may be effective in training and recognizing images rotated in various angles when recognizing an object. That is, when the artificial neural network learns to recognize a specific object, if there is a first kernel in which the base kernel is rotated and a second kernel in which the base kernel is transposed, the recognition rate when the image of a specific object is rotated or transposed can also be improved. In other words, when the artificial neural network learns only the frontal human face, the positions of the eyes, nose and mouth are reversed, so it may not recognize the human face inverted by 180 degrees. In particular, according to the example of the present disclosure, each corresponding kernel may not be read from the memory 200 by rotating or transposing the base kernel. Accordingly, there is an effect of reducing power consumption in view of memory read.

A method of generating another kernel from the base kernel is not limited thereto, and various algorithms that a user can implement through a program may be utilized.

As described above, by applying the kernel filter to the base kernel, the original kernel may be restored or a kernel similar to the original kernel may be generated. Accordingly, there is an effect that the capacity of the memory 200 can be effectively reduced. That is, if the base kernel is selected so that the value of the kernel filter is minimized, the data size of the kernel filter can be minimized, and the bit width of data storing the weight of the kernel filter can be minimized.

In other words, even if the kernels of all layers (or channels) are not stored in the memory 200, other kernels can be regenerated only with the base kernel. Therefore, it is possible to effectively reduce the amount of memory used and increase the operation speed.

In addition, by using the predetermined kernel filter of each layer, the amount of memory required can be reduced compared to storing the original kernel of each layer, and the kernel filter for respective layers determined after the training process can be flexibly applied according to the demand level of artificial intelligence. Therefore, it is possible to provide a user-customized artificial intelligence optimized for the user environment.

Figure 7:
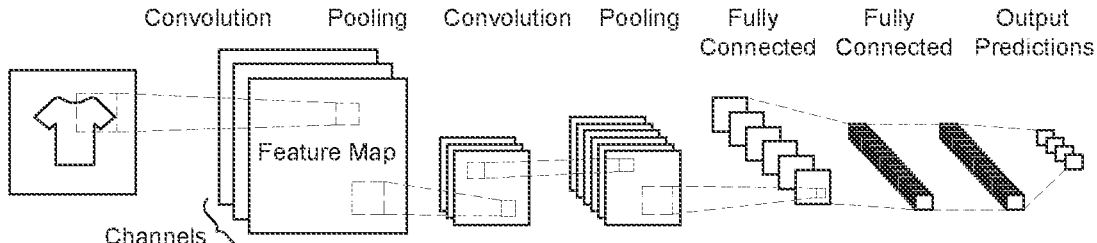
FIG. 7 is a diagram illustrating the basic structure of a convolutional neural network.

FIG. 7 illustrates the basic structure of a convolutional neural network.

Referring to FIG. 7, when moving from a current layer to a next layer, the convolutional neural network may reflect the weights between layers through convolution and transmit the weights to the next layer.

For example, convolution is defined by two main parameters. The size of the input data (typically a 1×1, 3×3, or 5×5 matrix) and the depth (the number of kernels) of the output feature map may be calculated by convolution. These convolutions may start at a depth of 32, continue to a depth of 64, and end at a depth of 128 or 256.

Convolution may operate by sliding a window having a size of 3×3 or 5×5 over a three-dimensional (3D) input feature map, stopping at any position, and extracting 3-D patches of surrounding features.

Each of these 3-D patches can be transformed into a one-dimensional (1-D) vector through a tensor product with the same training weight matrix called weights. These vectors can be spatially reassembled into a 3-D output feature map. All spatial locations of the output feature map may correspond to the same location of the input feature map.

A convolutional neural network may include a convolutional layer that performs a convolution operation between input data and a kernel (i.e., a weight matrix) that is trained over many iterations of gradient update during a training process. If (m, n) is the kernel size and W is set as the weight value, the convolution layer can perform convolution of the input data and the weight matrix by calculating the dot product.

A convolutional neural network can be tuned or trained so that input data leads to specific output estimates. A convolutional neural network can be tuned using backpropagation based on comparisons between ground truth and the output estimate until the output estimate progressively matches or approximates ground truth.

A convolutional neural network can be trained by adjusting the weights between neurons based on the difference between the ground truth data and the actual output.

Figure 8:
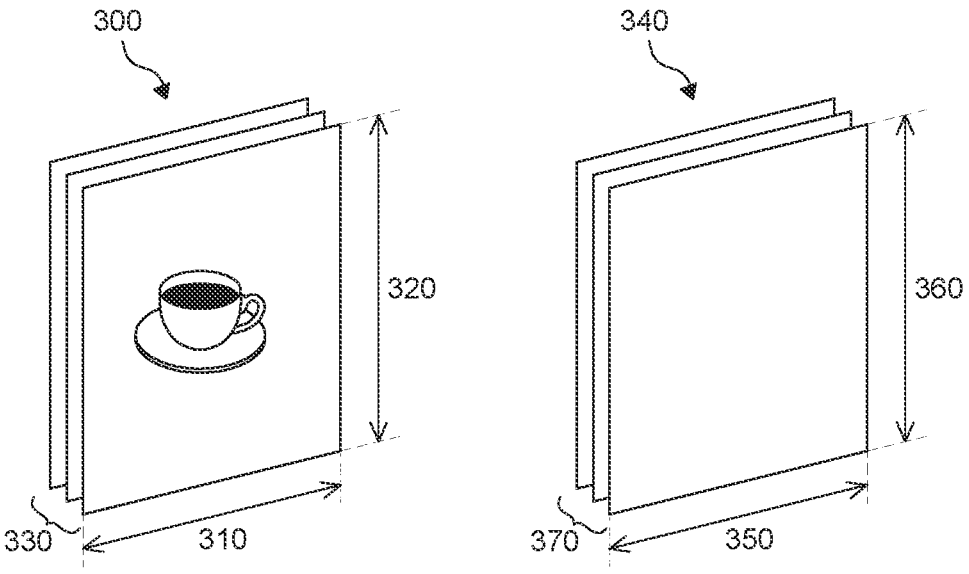
FIG. 8 is a diagram illustrating input data of a convolution layer and a kernel used for a convolution operation.

FIG. 8 illustrates input data 300 of a convolution layer and a kernel 340 used for a convolution operation.

The input data 300 may be an image or an image displayed as a two-dimensional matrix composed of a row 310 of a specific size and a column 320 of a specific size. The input data 300 may have a plurality of channels 330, where the channels 330 may represent the number of color components of the input data image.

Meanwhile, the kernel 340 may be a common parameter used for convolution for extracting features of a certain portion of the input data 300 while scanning it. Like the input data image, the kernel 340 may be configured to have a specific size of a row 350, a specific size of a column 360, and a specific number of channels 370. In general, the size of the row 350 and the column 360 of the kernel 340 is set to be the same, and the number of channels 370 may be the same as the number of channels 330 of the input data image.

Figure 9:
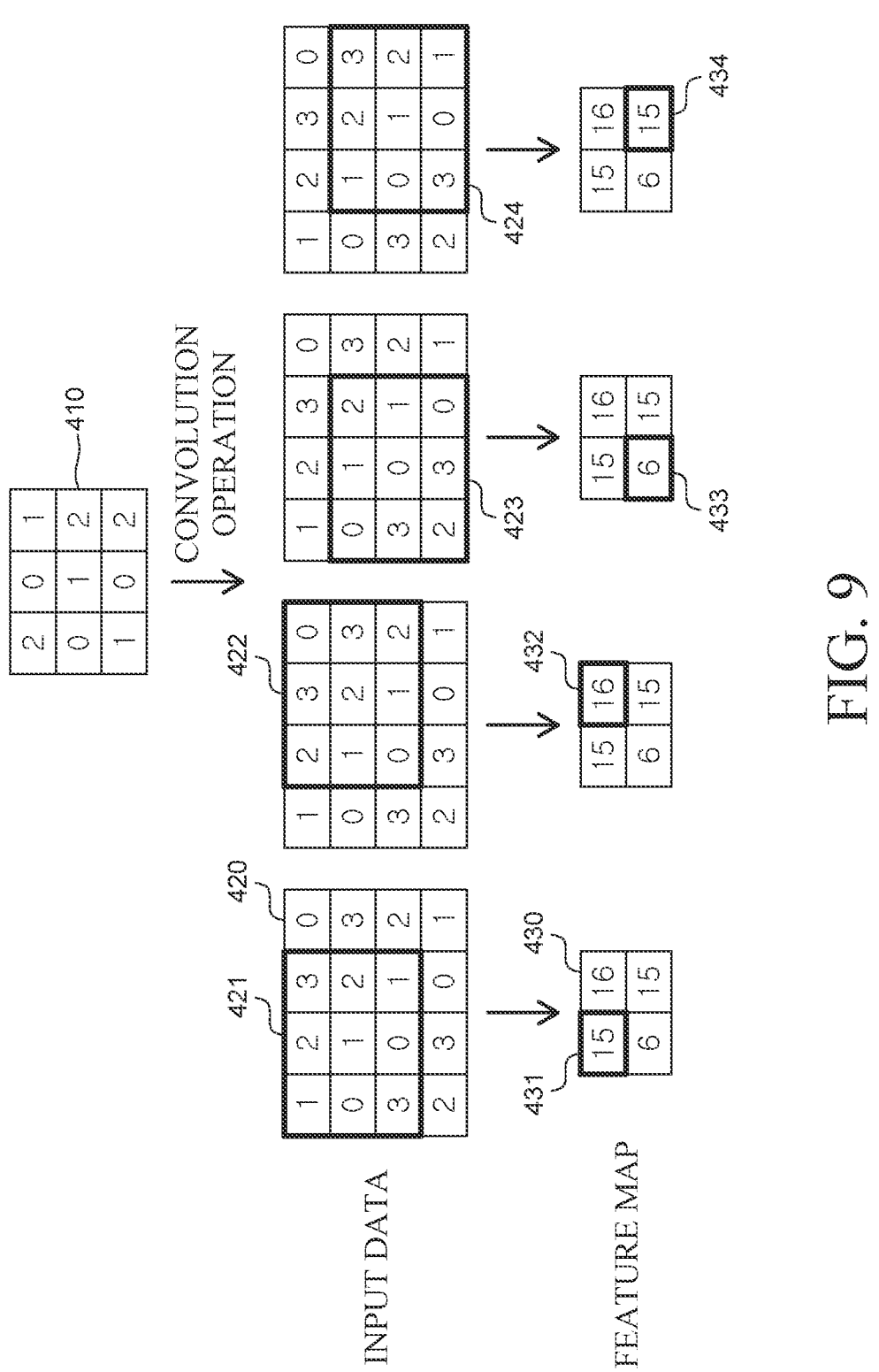
FIG. 9 is a diagram illustrating an operation of a convolutional neural network that generates an activation map using a kernel.

FIG. 9 illustrates an operation of a convolutional neural network that generates an activation map using a kernel.

The kernel 410 may finally generate the feature map 430 by traversing the input data 420 at a specified interval and performing convolution. When the kernel 410 is applied to a part of the input data 420, the convolution can be performed by multiplying the input data values of a specific position of the part and the values of the corresponding position of the kernel 410, respectively, and then adding all the generated values.

Through this convolution process, calculated values of the feature map are generated, and whenever the kernel 410 traverses the input data 420, the result values of the convolution are generated to configure the feature map 430. Each element value of the feature map is converted into the feature map 430 through the activation function of the convolutional layer.

In FIG. 9, the input data 420 input to the convolution layer is represented by a two-dimensional matrix having a size of 4×4, and the kernel 410 is represented by a two-dimensional matrix having a size of 3×3. However, the sizes of the input data 420 and the kernel 410 of the convolutional layer are not limited thereto, and may be variously changed according to the performance and requirements of the convolutional neural network including the convolutional layer.

As illustrated, when the input data 420 is input to the convolutional layer, the kernel 410 traverses the input data 420 at a predetermined interval (e.g., 1), and the input data 420 and the kernel elementwise multiplication may be performed by multiplying values of the same position in 410, respectively. The kernel 410 may traverse the input data 420 at regular intervals and summation of values obtained through multiple multiplication.

Specifically, the kernel 410 assigns the value "fifteen" of elementwise multiplication calculated at a specific location 421 of the input data 420 to the corresponding element 431 of the feature map 430. The kernel 410 assigns the value "sixteen" of the elementwise multiplication calculated at the next position 422 of the input data 420 to the corresponding element 432 of the feature map 430. The kernel 410 assigns the value "six" of the elementwise multiplication calculated at the next position 423 of the input data 420 to the corresponding element 433 of the feature map 430. Next, the kernel 410 assigns the value "fifteen" of the elementwise multiplication calculated at the next position 424 of the input data 420 to the corresponding element 434 of the feature map 430.

As described above, when the kernel 410 allocates all values of elementwise multiplication calculated while traversing the input data 420 to the feature map 430, the feature map 430 having a size of 2×2 may be completed.

At this time, if the input data 510 is composed of, for example, three channels (R channel, G channel, B channel), it is possible to generate a feature map for each channel through convolution in which the same kernel or different channels for each channel are traversed over the data for each channel of the input data 420, and elementwise multiplications and summations are performed.

Figure 10:
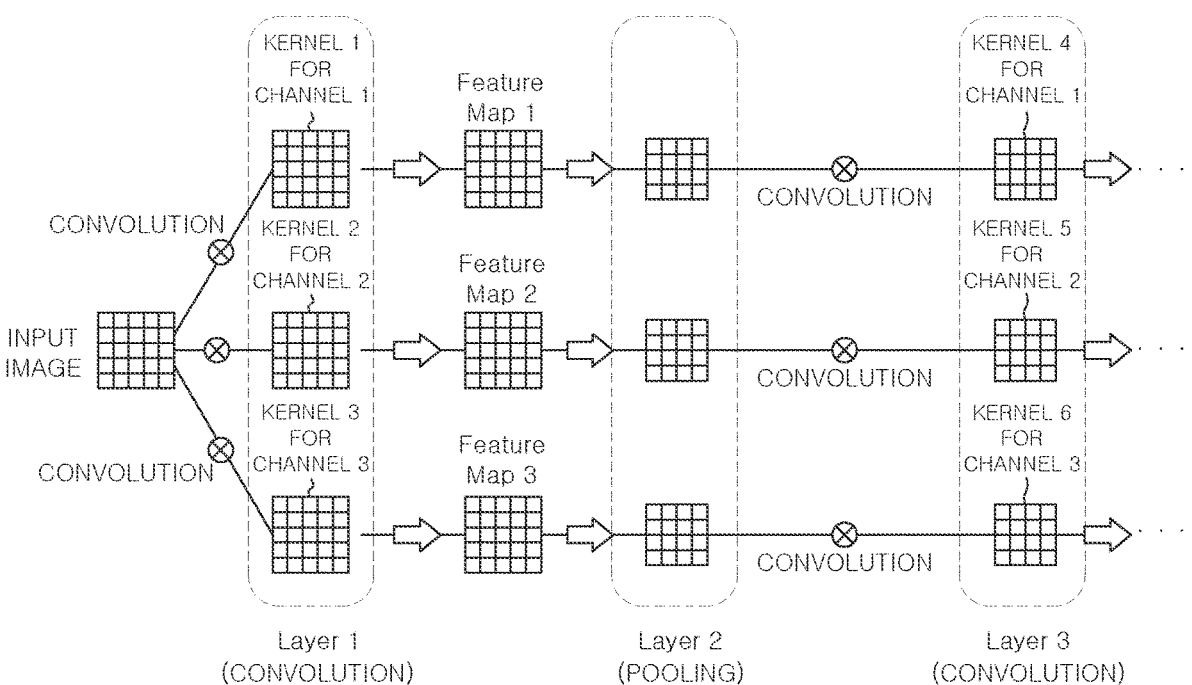
FIG. 10 is a general diagram illustrating the operation of the convolutional neural network described in FIGS. 7 to 9 for better comprehension.

FIG. 10 illustrates the operation of the convolutional neural network described in FIGS. 7 to 9.

Referring to FIG. 10, for example, an input image is illustrated as a two-dimensional matrix having a size of 5×5. Also, in FIG. 10, three nodes, i.e., channel one, channel two, and channel three, are used as an example.

First, the convolution operation for the first layer will be described.

The input image is convolved with the first kernel for channel one at the first node of the first layer, and as a result, feature map one is output. Also, the input image is convolved with the second kernel for channel two at the second node of the first layer, and as a result, feature map two is output. Also, the input image is convolved with the third kernel for channel three at the third node, and as a result, feature map three is output.

Next, polling operation for the second layer will be described.

The feature map one, the feature map two, and the feature map three outputted from the methods first layer are input to the three nodes of the methods second layer. The second layer may receive feature maps outputted from the first layer as input and perform polling. The polling may reduce the size or emphasize a specific value in a matrix. Polling methods may include maximum polling, average polling, and minimum polling. Maximum polling is used to collect the maximum values in a specific region of a matrix, and average polling can be used to find the average in a specific region.

In the example of FIG. 10, the size of the feature map of a 5×5 matrix is reduced to a 4×4 matrix by polling.

Specifically, the first node of the methods second layer receives the feature map one for channel one as an input, performs polling, and outputs, for example, a 4×4 matrix. The second node of the methods second layer receives the feature map two for channel two as an input, performs polling, and outputs, for example, a 4×4 matrix. The third node of the second layer receives the feature map three for channel three as an input, performs polling, and outputs, for example, a 4×4 matrix.

Next, convolution operation for the third layer will be described.

The first node of the third layer receives the output from the first node of the second layer as input, performs convolution with the fourth kernel, and outputs the result. The second node of the third layer receives the output from the second node of the second layer as an input, performs convolution with the fifth kernel for channel two, and outputs the result. Similarly, the third node of the third layer receives the output from the third node of the second layer as input, performs convolution with kernel six for channel three, and outputs the result.

In this way, convolution and polling are repeated, and finally, as illustrated in FIG. 7, the output may be output by a fully connected layer. The corresponding output may be input to an artificial neural network for image recognition again.

Figure 11:
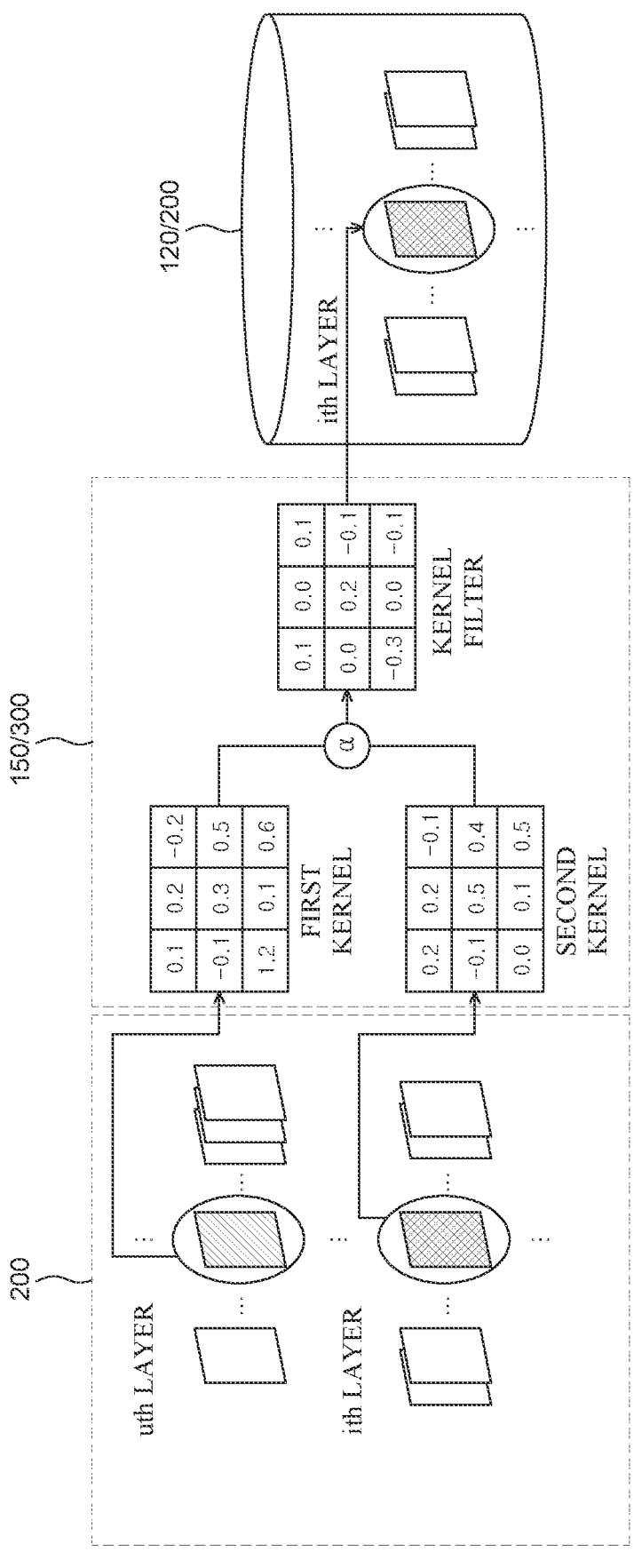
FIG. 11 is a diagram illustrating generation of a kernel filter.

FIG. 11 illustrates the generation of a kernel filter.

For an artificial neural network model, there may be a plurality of kernels for a plurality of layers and/or a plurality of channels.

In the example of FIG. 11, the kernels for a uth layer (or uth channel) and the kernels for an ith layer (or ith channel) are illustrated. Such a plurality of kernels may be stored in the memory 200 illustrated in FIG. 5A or FIG. 6A or 6B.

The uth layer/channel may include the first kernel indicated by diagonal stripes, and the ith layer/channel may include the second kernel indicated by a grid pattern.

One of the first kernel and the second kernel may be set as a base kernel.

A kernel filter may be generated by performing an arbitrary operation alpha (a) on a plurality of kernels. It is illustrated in FIG. 11 that an arbitrary operation a or transformation is performed on the first kernel for the uth layer/channel and the second kernel for the ith layer/channel to generate the kernel filters. The operation a may include, for example, addition, multiplication, division, a combination of arithmetic operations, a convolution operation, and various other operations.

Since the bit width of the generated kernel filter is smaller than the bit width of the original kernel, there is an advantage in that the burden of accessing the memory 200 can be reduced.

In FIG. 11, the generated kernel filter may be stored in the NPU internal memory 120 of FIG. 1 or 3 or the memory 200 of FIG. 5A or 6A or 6B.

As illustrated in FIG. 11, the kernel filter is generated from kernels of different layers, but the kernel filter may be generated from kernels of the same layer.

According to an example, the uth layer and the ith layer may be adjacent layers or distant layers, or at least three kernels may be combined in various ways to generate a kernel filter.

As illustrated in FIG. 11, if the kernel filter is generated and stored in the memory 120 or 200, the kernel generator 300 of FIG. 5A, the kernel generator 150 of FIG. 6A, or the kernel generator 240 of FIG. 6B may restore the original kernel or generate a kernel similar to the original kernel by combining the base kernel and the kernel filter.

In the artificial neural network (e.g., CNN) model training process, the kernel filter may be set to have a smaller bit width (or a smaller bit size). For example, in the process of training an artificial neural network (e.g., CNN) model, when a plurality of candidates for the kernel filter can be generated, any one having the smallest bit width (or small bit size) may be selected as the kernel filter.

A kernel filter can be generated with various combinations of programmatically implementable kernels. For example, in the training process, the convolutional neural network performs training in a direction to minimize the difference between the kernels between adjacent layers while minimizing the difference between the estimated value and the target value. In this case, a kernel filter may be determined based on a difference value between kernels between layers. Alternatively, a kernel filter may be generated through various methods other than addition, multiplication, division, combination of arithmetic operations, and convolution operation for kernels between layers.

Figure 12:
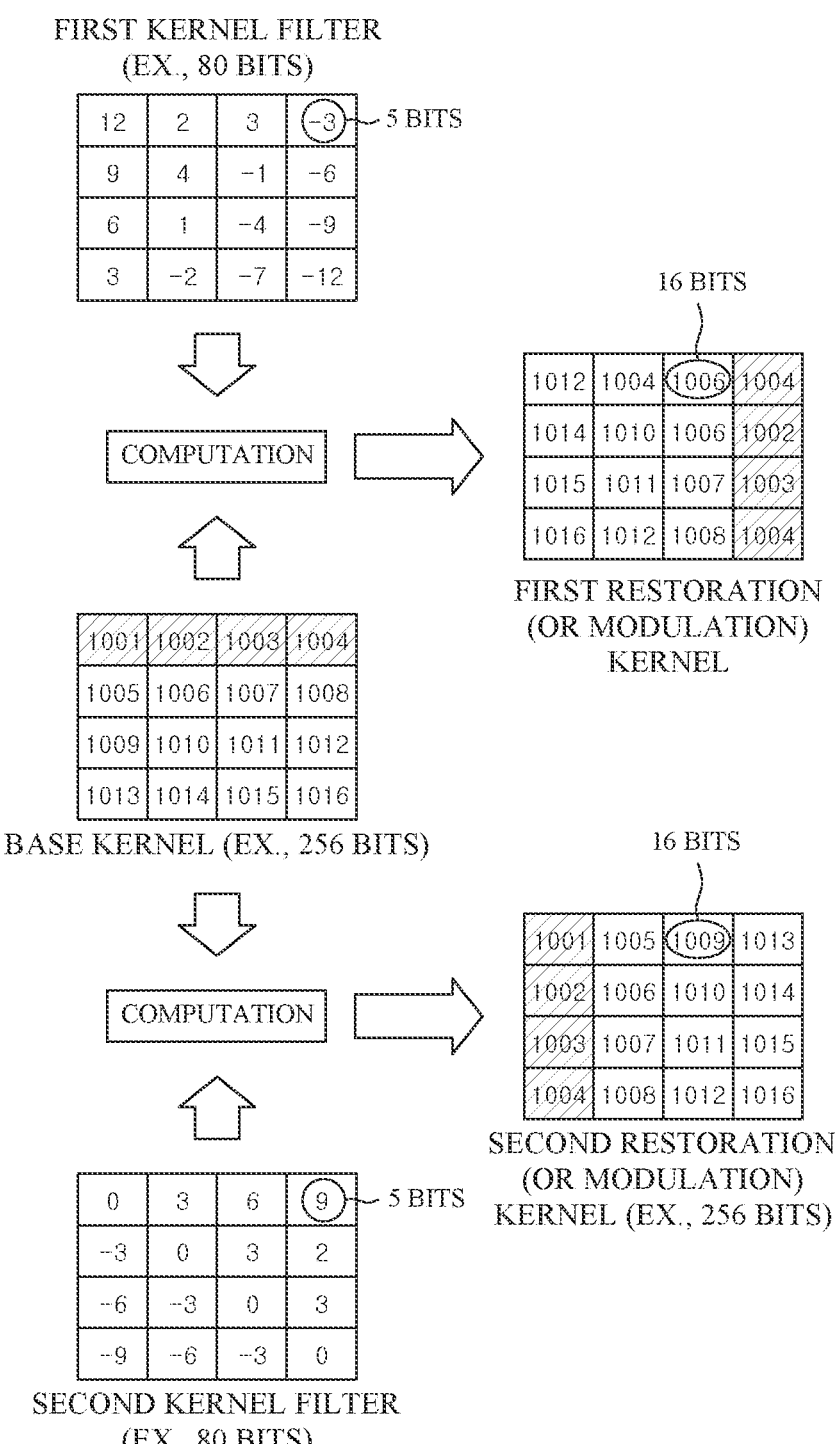
FIG. 12 is an exemplary diagram illustrating an example of restoring an original kernel or generating a kernel similar to the original kernel.

FIG. 12 illustrates an example of restoring an original kernel or generating a kernel similar to the original kernel.

Referring to FIG. 12, the base kernel is illustrated to be a 4×4 matrix. If the bit width of the matrix element of the base kernel is 16 bits, the total data size of the 4×4 matrix may be a total of 256 bits. Referring to FIG. 12, the kernel filter is illustrated as a 4×4 matrix. If the bit width of the matrix element of the kernel filter occupies 5 bits, the total data size of the kernel filter having the 4×4 matrix size may be a total of 80 bits.

When a restoration operation is performed based on the base kernel and the first kernel filter, a first restoration (or modulation) kernel may be generated.

In addition, when a restoration operation is performed based on the base kernel and the second kernel filter, a second restoration (or modulation) kernel may be generated.

In FIG. 12, the first and second restoration (or modulation) kernels are exemplarily represented as 4×4 matrices. However, alternatively, the first or second restoration (or modulation) kernel may be, for example, larger or smaller than the matrix size of the base kernel. For example, the first restoration (or modulation) kernel may be a 5×5 matrix, and the second restoration (or modulation) kernel may be a 3×3 matrix. Conversely, the first restoration (or modulation) kernel may be a 3×3 matrix, and the second restoration (or modulation) kernel may be a 5×5 matrix.

Figure 13:
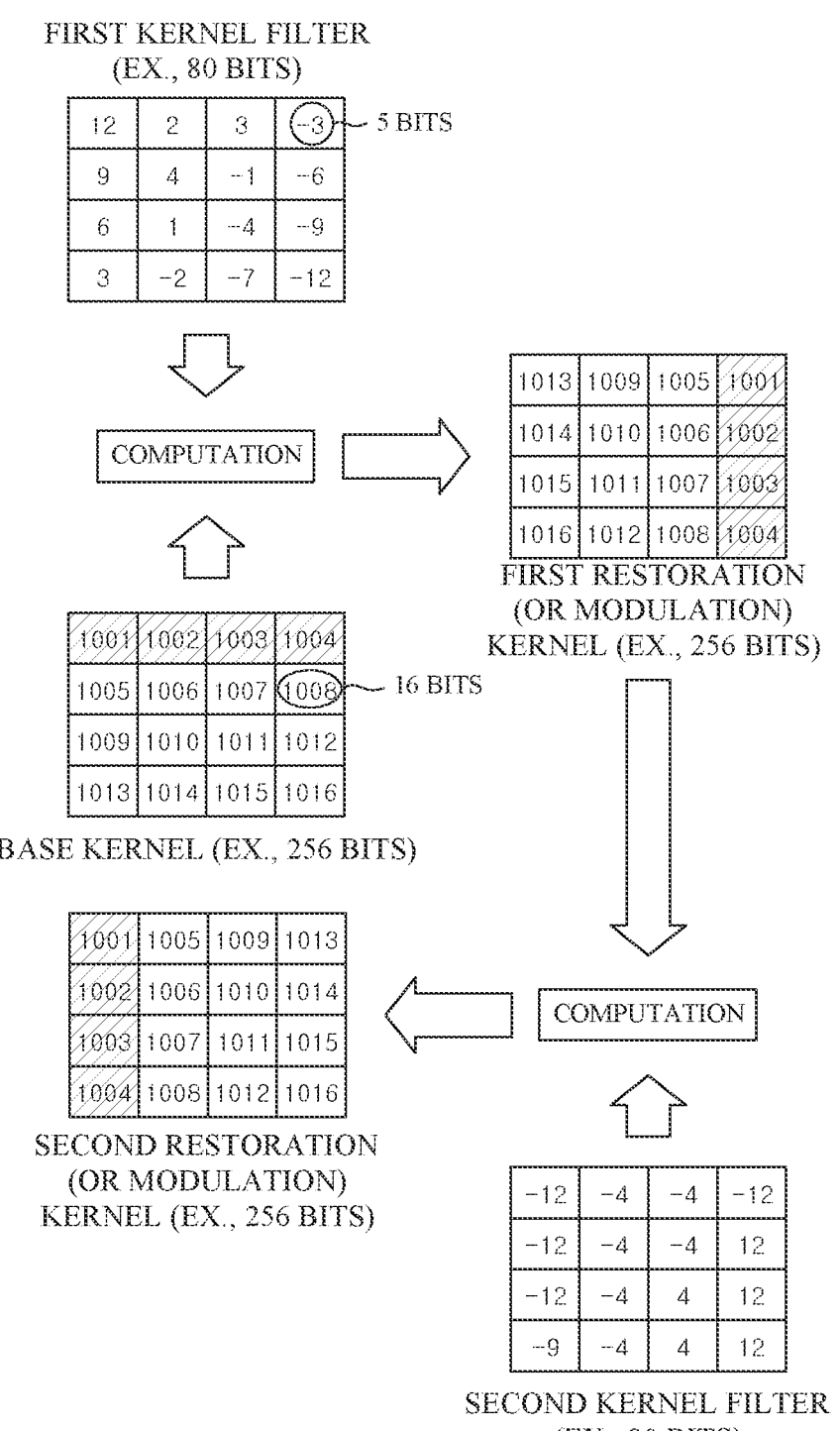
FIG. 13 is an exemplary diagram illustrating another example of restoring an original kernel or generating a kernel similar to the original kernel.

FIG. 13 illustrates another example of restoring an original kernel or generating a kernel similar to the original kernel.

Referring to FIG. 13, the base kernel is illustrated as a 4×4 matrix as an example. If the bit width of the matrix element of the base kernel is 16 bits, the data size of the 4×4 matrix may be a total of 256 bits. Referring to FIG. 13, the kernel filter is illustrated as an exemplary 4×4 matrix. If the bit width of the matrix element of the kernel filter occupies 5 bits, the data size of the kernel filter having the 4×4 matrix size may be a total of 80 bits.

When a restoration operation is performed based on the base kernel and the first kernel filter, then a first restoration (or modulation) kernel may be generated.

Unlike the example of FIG. 12, in FIG. 13, the second kernel filter may not be applied to the base kernel, but may be applied to the first restored (or modulated) kernel.

Specifically, when a restoration operation is performed based on the first restoration (or modulation) kernel and the second kernel filter, then a second restoration (or modulation) kernel may be generated.

In FIG. 13, the first and second restoration (or modulation) kernels are exemplarily represented as 4×4 matrices. However, unlike this, the first or second restoration (or modulation) kernel may be, for example, larger or smaller than the matrix size of the base kernel. For example, the first restoration (or modulation) kernel may be a 5×5 matrix, and the second restoration (or modulation) kernel may be a 3×3 matrix. Alternatively, the first restoration (or modulation) kernel may be a 3×3 matrix, and the second restoration (or modulation) kernel may be a 5×5 matrix.

FIG. 14 illustrates another example of restoring an original kernel or generating a kernel similar to the original kernel.

Referring to FIG. 14, the base kernel is illustrated as a 4×4 matrix as an example. If the bit width of the matrix element of the base kernel is 16 bits, the data size of the 4×4 matrix may be a total of 256 bits. Referring to FIG. 14, the kernel filter is illustrated as an exemplary 4×4 matrix. If the bit width of the matrix element of the kernel filter occupies 5 bits, the data size of the kernel filter having the 4×4 matrix size may be a total of 80 bits.

Unlike the example of FIG. 13, in FIG. 14, a second restored (or modulated) kernel may be generated by performing arbitrary operations on the first kernel filter and the second kernel filter.

Specifically, when a restoration operation is performed based on the base kernel and the first kernel filter, a first restoration (or modulation) kernel may be generated.

In addition, when a restoration operation is performed based on the first kernel filter and the second kernel filter, a second restoration (or modulation) kernel may be generated.

In FIG. 14, the first and second restoration (or modulation) kernels are exemplarily represented as 4×4 matrices. However, alternatively, the first or second restoration (or modulation) kernel may be, for example, larger or smaller than the matrix size of the base kernel. For example, the first restoration (or modulation) kernel may be a 5×5 matrix, and the second restoration (or modulation) kernel may be a 3×3 matrix. Conversely, the first restoration (or modulation) kernel may be a 3×3 matrix, and the second restoration (or modulation) kernel may be a 5×5 matrix.

Figure 15:
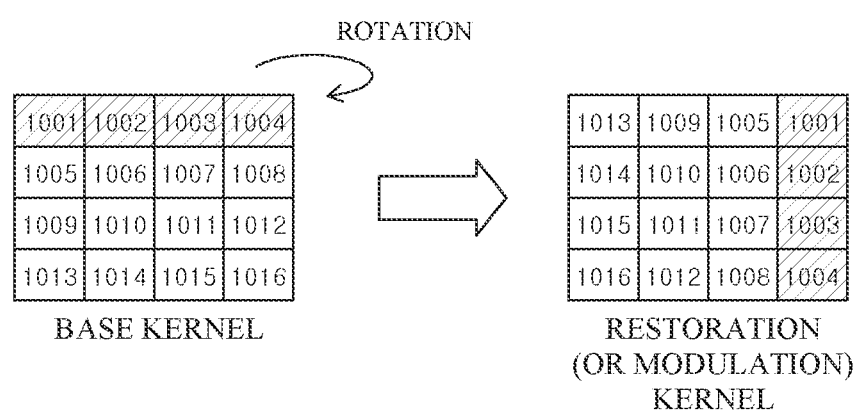
FIG. 15 shows an example of generating another kernel by rotating a base kernel.

FIG. 15 shows an example of generating another kernel by rotating a base kernel.

Referring to FIG. 15, another base kernel may be generated by rotating the base kernel. Compared with the examples of FIGS. 12 to 14, in the example of FIG. 15, another kernel may be generated by modifying the base kernel itself without using a kernel filter.

Accordingly, there is an effect of reducing the amount of data to be transmitted compared to the examples of FIGS. 12 to 14 in which the base kernel and the kernel filter must be loaded from the memory. In addition, according to the required artificial intelligence performance, it can be applied at the same time as the kernel filter to operate at low power.

Figure 16:
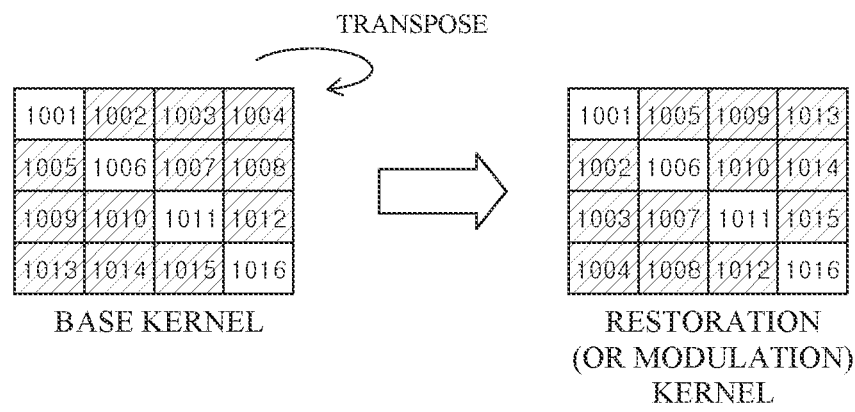
FIG. 16 shows an example of generating another kernel by transposing a base kernel.

FIG. 16 shows an example of generating another kernel by transposing a base kernel.

Referring to FIG. 16, another base kernel may be generated by transposing the base kernel. Compared with the examples of FIGS. 12 to 14, the example of FIG. 16 may also generate another kernel by modifying the base kernel itself without using a kernel filter.

Accordingly, compared to the examples of FIGS. 12 to 14 in which the base kernel and the kernel filter must be loaded from the memory, the amount of transmitted data can be reduced. In addition, according to the required artificial intelligence performance, it can be applied at the same time as the kernel filter to operate with lower power.

The rotation illustrated in FIG. 15 and the transpose illustrated in FIG. 16 are merely examples, and a kernel may be generated according to various algorithms that may be implemented as a program. Various kernel generation methods including rotation and transpose may be appropriately selected and applied simultaneously, and the convolutional neural network can perform an operation to find an optimal combination.

Figure 17:
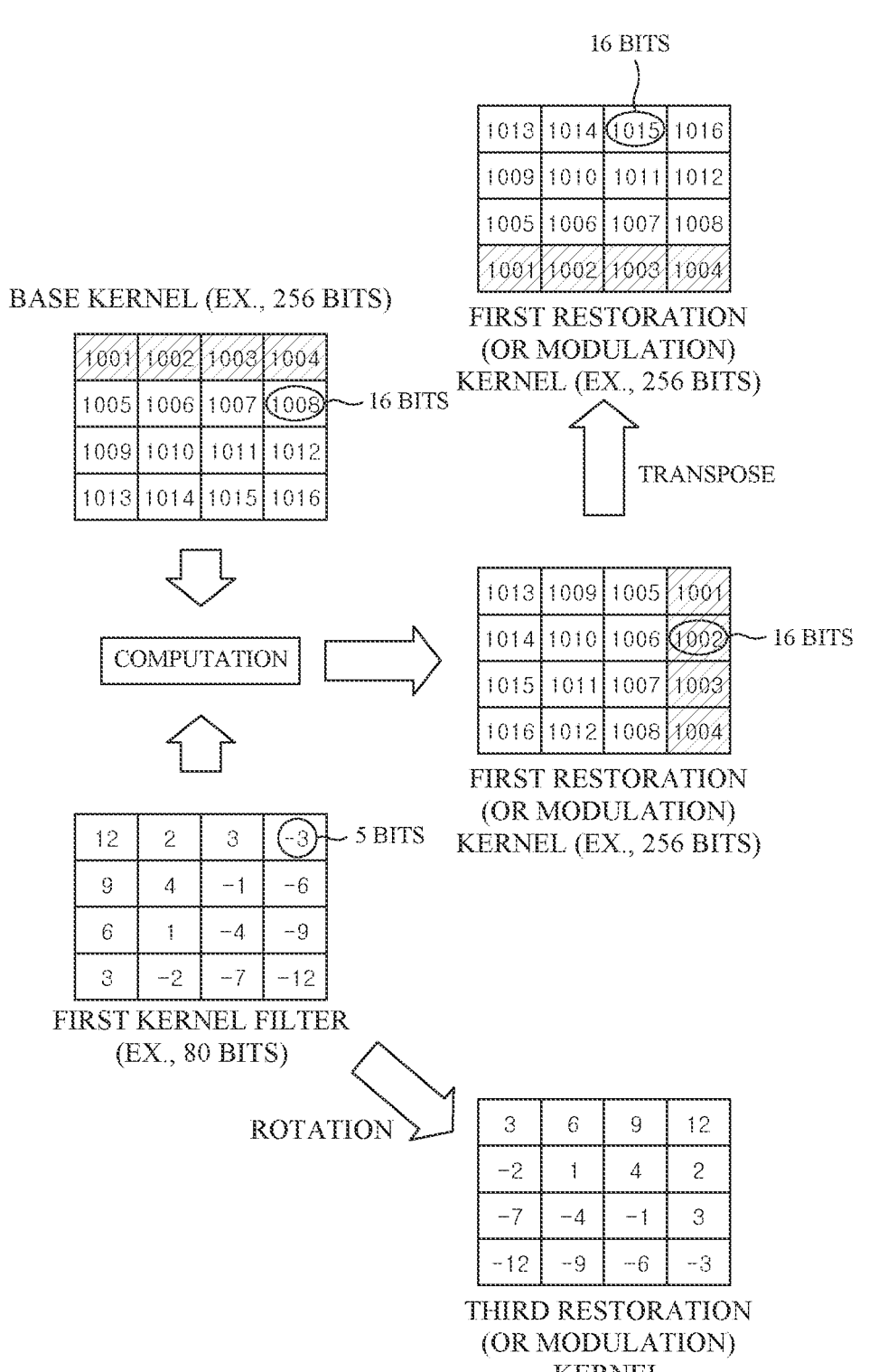
FIG. 17 shows an example of generating another kernel by transposing a base kernel.

FIG. 17 shows an example of generating another kernel by transposing a base kernel.

Referring to FIG. 17, the base kernel is illustrated as a 4×4 matrix as an example.

When a restoration operation is performed based on the base kernel and the first kernel filter, a first restoration (or modulation) kernel may be generated.

In addition, when the first restored (or modulated) kernel is transposed as shown in FIG. 16, a second restored (or modulated) kernel may be generated.

Also, if the first kernel filter is rotated, a third reconstructed (or modulated) kernel may be generated.

FIG. 18 illustrates a kernel generation algorithm (or a kernel restoration algorithm) arranged in a table for better comprehension.

The kernel generation algorithm (or kernel restoration algorithm) may be an algorithm in which an operation processing method of input data is defined through a training process. The kernel generation algorithm (or kernel restoration algorithm) may be generated according to an algorithm determined to have optimum accuracy through a series of training processes.

The kernel generation algorithm (or kernel restoration algorithm) may include the number of layers used, input data information, an arithmetic processing method, an order of fetching a kernel from memory, and the like.

Also, the kernel generation algorithm (or kernel restoration algorithm) may include information for restoring an original kernel of a specific layer or generating a kernel similar to the original kernel, i.e., mapping information.

A method of restoring other original kernels (i.e., a modulated kernel or a restored kernel) using the base kernel or generating a kernel similar to the original kernel may be applied differently for each layer or for each channel. Specifically, a method of restoring the original kernels or generating a kernel similar to the original kernel may include one of a first method of using the base kernel as it is for another layer or channel, a second method using a kernel filter, a third method of modifying the base kernel itself regardless of the kernel filter, a fourth method of simultaneously modifying the kernel filter and the base kernel, and the like.

For example, a kernel generation algorithm (or kernel restoration algorithm) may instruct: the first layer to use the base kernel as is, the kernel corresponding to the second layer to the fourth layer to be generated by rotating the base kernel; the kernel corresponding to the fifth layer to be generated by transposing the base kernel; the weights corresponding to the sixth to eighth layers to be generated by adding or subtracting the kernel filter to the base kernel; and the kernel corresponding to the ninth layer to be generated by rotating the kernel while adding the kernel filter.

According to the present disclosure, if the kernel filter of each layer determined in the training process is utilized, the amount of memory used can be reduced compared to storing the entire kernel of each layer (that is, the weight matrix), and the kernel filters between layers determined in the training process can be flexibly adjusted according to the demand level of artificial intelligence. Accordingly, it has the effect of providing user-customized artificial intelligence optimized for the user environment.

Referring to FIG. 18, as the first kernel for channel one of the first layer, the first kernel is determined as a base kernel in the first layer. The second kernel for channel two of the first layer may be restored (or generated) by a combination of the first kernel and the second kernel filter corresponding to the base kernel. The third kernel for channel three of the first layer may be restored (or generated) by the first kernel corresponding to the base kernel, the first kernel filter, and rotation. Although not shown in the table, information on whether the rotation is performed for the first kernel or the first kernel filter may be further required. The fourth kernel for channel 4 of layer 1 may be restored (or created) by the first kernel, the second kernel filter, and transpose. Although not shown in the table, information on whether the transpose is performed for the first kernel or the second kernel filter may be further required.

Meanwhile, the kernel for channel one of the eleventh layer is the tenth kernel and may be a base kernel for the eleventh layer. The eleventh kernel for channel two of the eleventh layer may be restored (or generated) by a combination of the tenth kernel and the sixth kernel filter corresponding to the base kernel. In addition, the twelfth kernel for channel two of the eleventh layer may be restored (or generated) by a combination of the tenth kernel corresponding to the base kernel and the eighth kernel filter.

Information for restoring a kernel of a specific layer or generating a kernel similar to the original kernel, i.e., mapping information, shown in the table in FIG. 18, is at most tens or hundreds of kilobytes (kB) in size. Accordingly, there is an advantage in that the storage capacity can be remarkably reduced compared to the size required to store the entire kernel for all layers, for example, hundreds of megabytes as in a known art.

Figure 19:
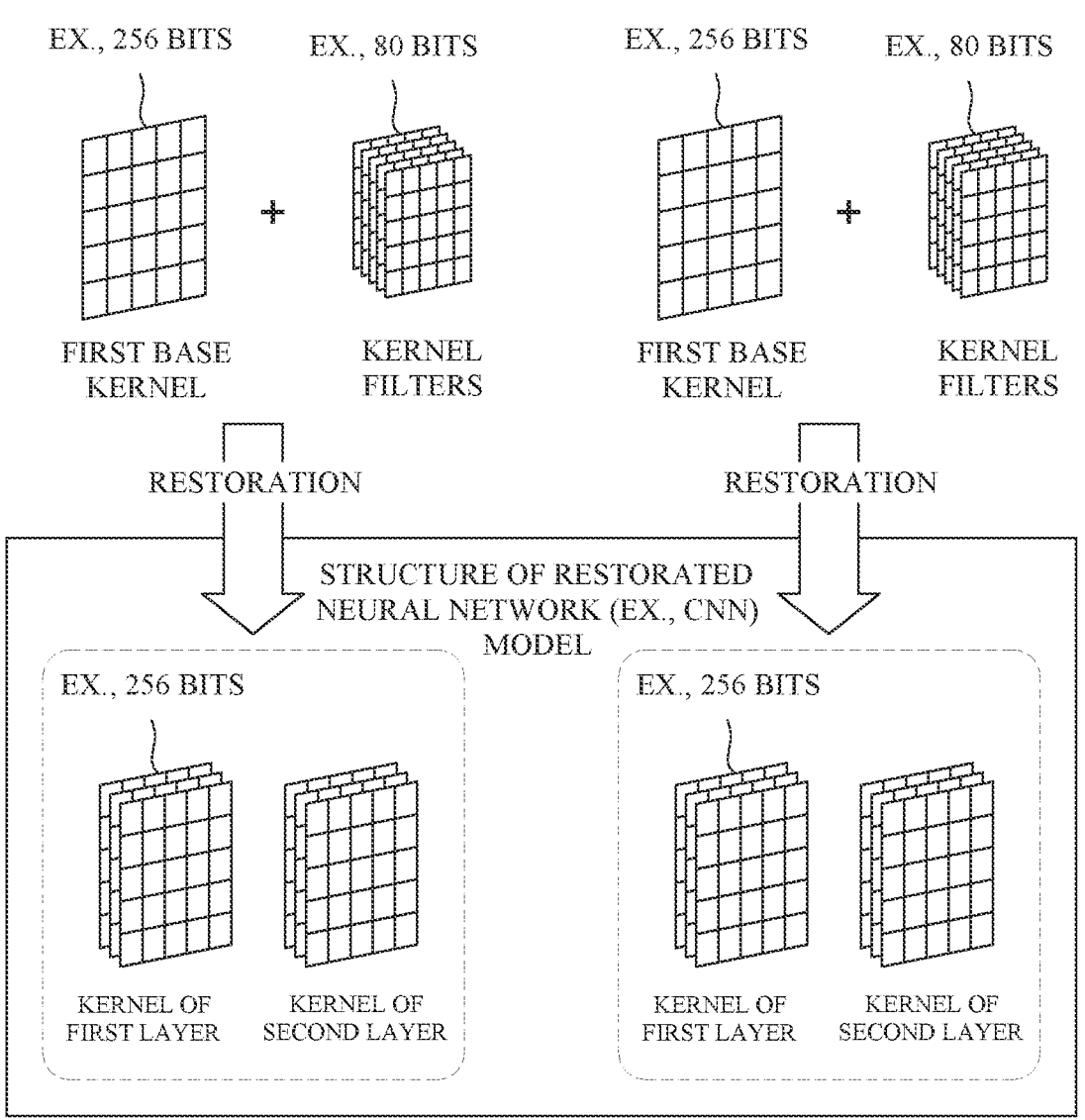
FIG. 19 is an exemplary diagram illustrating a concept of restoring the structure of an artificial neural network (e.g., CNN) model using a plurality of base kernels and a plurality of kernel filters.

FIG. 19 illustrates a concept of restoring the structure of an artificial neural network (e.g., CNN) model using a plurality of base kernels and a plurality of kernel filters.

As illustrated in FIG. 19, a plurality of kernel filters corresponding to the first base kernel may exist, and a plurality of kernel filters corresponding to the second base kernel may exist. According to the example shown in FIG. 19, each base kernel may be, for example, 256 bits, and each kernel filter may be, for example, 16 bits.

In FIG. 19, it is shown that when an operation is performed by combining the first base kernel and the corresponding kernel filters, the kernels of the first layer and the second layer are restored (or created), and it is shown that when an operation is performed by combining the second base kernel and the corresponding kernel filters, the kernels of the third layer and the fourth layer are restored (or generated).

In the example shown in FIG. 19, since there are four layers and three kernels are required for each layer, a total of twelve kernels are used. In this case, 256 bits multiplied by twelve kernels requires 3,702 bits to be stored in memory. However, when the kernel filter is used, the total required memory size is reduced to 672 bits with two base kernels of 256-bit size and five kernel filters of 16-bit size. As described above, when the kernel filter is used, there is an advantage in that the required memory size can be remarkably reduced.

Figure 20:
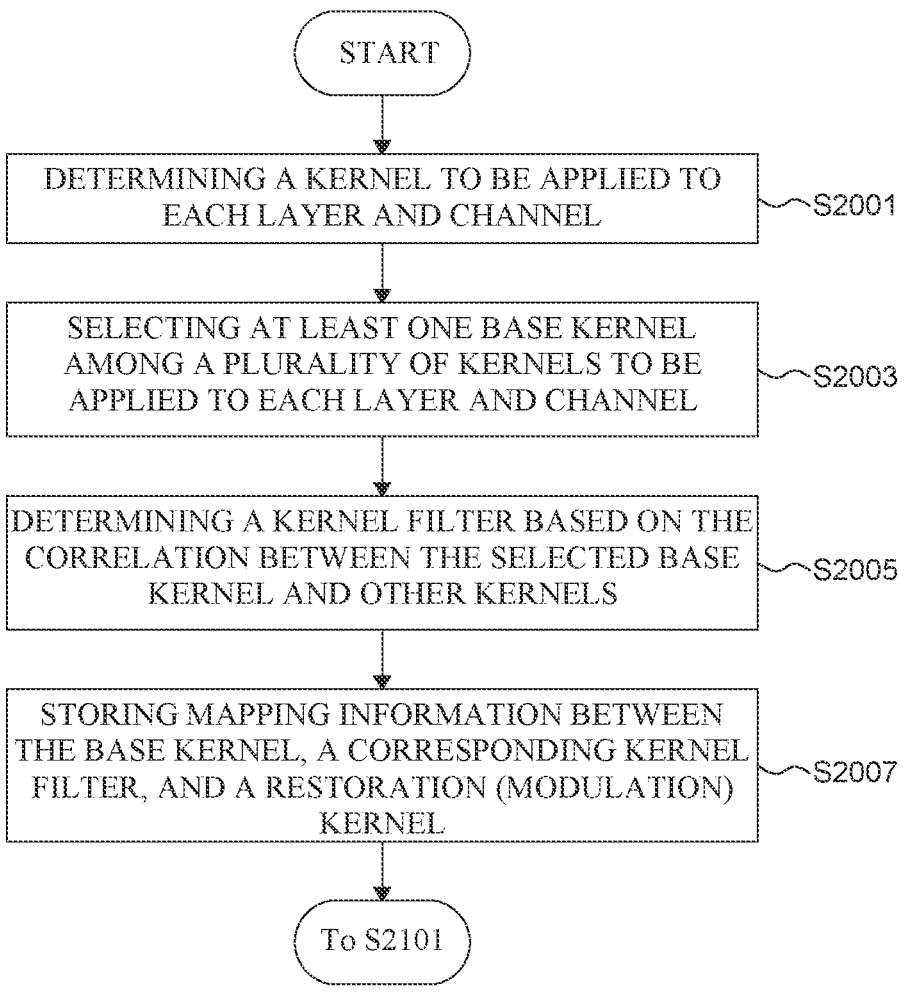
FIG. 20 is a flowchart illustrating steps for determining a base kernel and a kernel filter.

FIG. 20 illustrates a procedure for determining a base kernel and a kernel filter.

The procedure shown in FIG. 20 may be performed in a machine learning process of an artificial neural network, for example, a convolutional neural network. Machine learning can be an algorithm in which a computer learns from data, finds patterns on its own, and learns to take appropriate actions. For example, machine learning may include supervised learning, unsupervised learning, and reinforcement learning.

In step S2001, a kernel (i.e., a matrix including weight values) to be applied to each layer and channel of an artificial neural network model, for example, a convolutional neural network model, may be determined.

For example, when the input information is an image and the image can be divided into three channels of a red channel, a green channel, and a blue channel, three kernels for three channels may be determined for each layer. Specifically, three kernels may be determined for three channels in the first layer, and three kernels for three channels may be determined in the second layer. Alternatively, when the input image can be divided into five channels, five kernels for five channels may be determined for each layer. Alternatively, a plurality of kernel candidates may be determined for each channel. For example, when two kernel candidates are determined per channel, if there are five channels, a total of ten kernel candidate kernels may be determined.

In step S2003, at least one base kernel may be selected from among a plurality of kernels to be applied to each layer and channel. The selected base kernel may minimize the bit width (or data size) of the kernel filter.

In step S2005, based on the correlation between the selected base kernel and other kernels, a kernel filter may be determined.

For example, when three kernels exist for three channels of the first layer, any one of the three kernels may be selected as the base kernel for the first layer. Specifically, the first kernel may be selected as the base kernel from among the first kernel, the second kernel, and the third kernel. In addition, the first kernel filter may be determined based on the correlation between the base kernel and the second kernel, and the second kernel filter may be determined based on the correlation between the base kernel and the third kernel.

As another example, when three kernels for three channels of a first layer exist and three kernels for three channels of a second layer exist, one of the six kernels may be selected as the base kernel for the first layer and the second layer. Specifically, the third kernel is selected as the base kernel from among the first kernel to the third kernel for the first layer and the fourth kernel to the sixth kernel for the second layer, and kernel filters may be determined based on the correlation between the third kernel, which is the base kernel, and other kernels.

As another example, when the first layer, the second layer, and the third layer exist, assuming that three kernels for three channels exist for each layer, a total of nine kernels exist. In this case, one of five kernels including three kernels in the first layer and two kernels in the second layer may be selected as the first base kernel. In addition, one of four kernels including the remaining one kernel of the second layer and three kernels of the third layer may be selected as the second base kernel.

As another example, it is assumed that three layers exist and three channels (e.g., a red channel, a green channel, and a blue channel) exist. Then, in the first layer, the first kernel for the red channel, the second kernel for the green channel, and the third kernel for the blue channel exist; in the second layer, the fourth kernel for the red channel, the fifth kernel for the green channel, and the sixth kernel for the blue channel exist; and, in the third layer, the seventh kernel for the red channel, the eighth kernel for the green channel, and the ninth kernel for the blue channel exist. At this time, one of the three kernels (i.e., first kernel for the red channel of the first layer, fourth kernel for the red channel of the second layer, and seventh kernel for the red channel of the third layer) for the red channel may be selected as the first base kernel. Similarly, one of a second kernel for the green channel of the first layer, a fifth kernel for the green channel of the second layer, and an eighth kernel for the green channel of the third layer may be selected as the second base kernel. Similarly, one of a third kernel for the green channel of the first layer, a sixth kernel for the blue channel of the second layer, and a ninth kernel for the blue channel of the third layer may be selected as the third base kernel. In general, three kernels in three layers for one channel (e.g., a red channel) may be similar to each other. Accordingly, one of the three kernels may be selected as the base kernel, and the other two kernels may be restored through the kernel filter. In addition, since three kernels in three layers for one channel (e.g., a red channel) may be similar to each other, the bit width (or bit size) of the kernel filter may be reduced.

Meanwhile, a plurality of candidates may exist for the kernel filter, but a kernel filter satisfying a predefined rule may be finally selected from among the plurality of candidates through a training process.

The predefined rule may include a bit width (or bit size) of a kernel filter, an amount of computation, a benefit cost ratio, power usage, accuracy, or a combination thereof.

For example, the kernel filter may be set during the training process of the ANN model by applying a global weighting function including a delta function, a coefficient function, a rotation function, a transpose function, a bias function, and a cost function with accuracy and weight size reduction ratio.

As a specific example, a kernel filter having the smallest bit width (or bit size) and the highest accuracy among the plurality of kernel filter candidates may be selected. The selection of the kernel filter may be updated for every training process of the artificial neural network, and may be finally completed after training is completed.

In step S2007, mapping information between the base kernel, a corresponding kernel filter, and a restoration (modulation) kernel may be stored. The mapping information may be stored in the kernel generation algorithm storage 230 in the memory 200 of FIG. 5A or FIG. 6.

Figure 21:
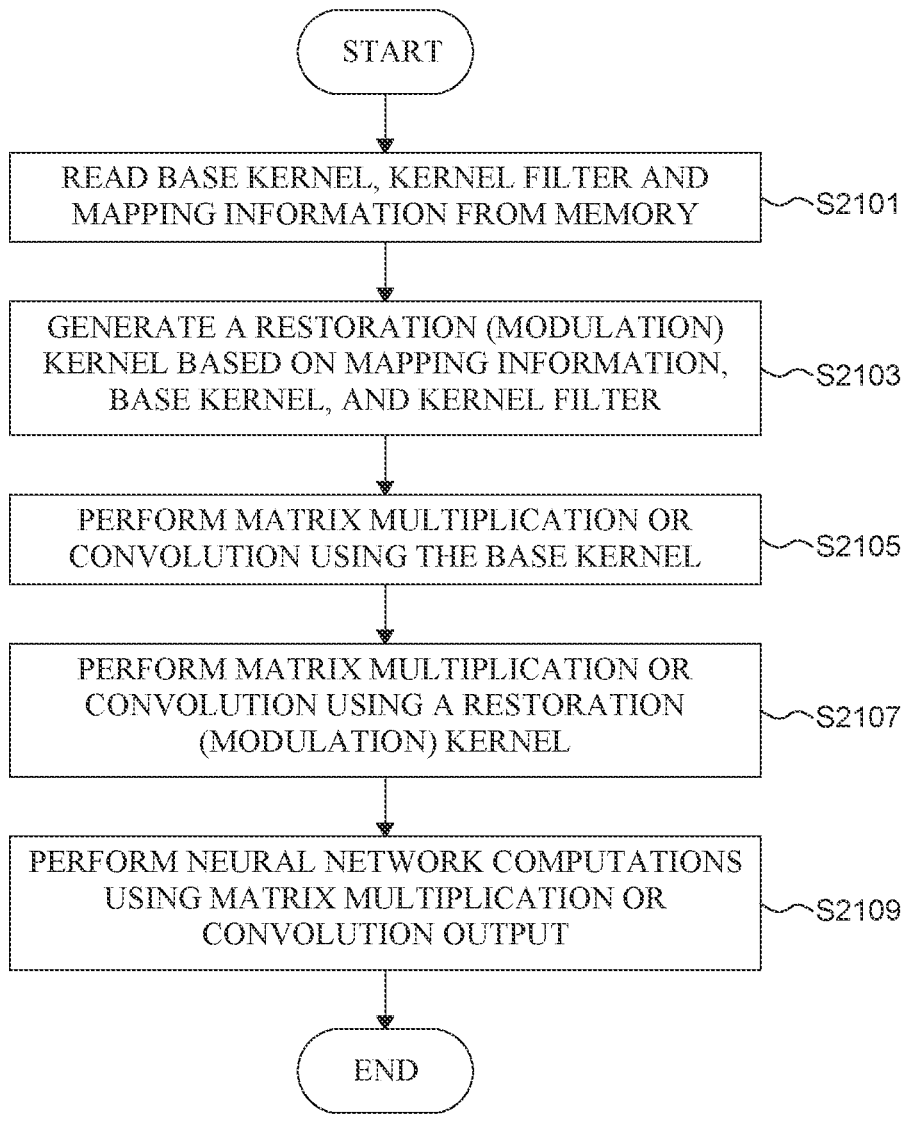
FIG. 21 is a flowchart illustrating steps after kernel restoration of a convolutional neural network.

FIG. 21 illustrates an application procedure after kernel restoration of a convolutional neural network.

Referring to FIG. 21, the application procedure can be started from the process S2007 of FIG. 20. However, if there is a very long-time difference between the process S2007 and the process S2101, it may be recognized as a separate process. Alternatively, it may be recognized separately by being performed by different apparatus. For example, the procedure shown in FIG. 20 may be performed in a device having high-performance computing power, and the procedure shown in FIG. 21 may be performed by an apparatus including the neural processing unit 100 of FIG. 1 or FIG. 3.

In step S2101, the kernel generator 300 of FIG. 5A, the kernel generator 150 in the neural processing unit 100 of FIG. 6A, or the kernel generator 240 in the memory 200 of FIG. 6B reads a kernel generation algorithm (i.e., a kernel restoration algorithm) including mapping information, a base kernel, and a kernel filter from the memory 200.

For example, the kernel generator 300 of FIG. 5A may store the base kernel, the kernel filter, and the mapping information which are fetched into the internal memory 310. Alternatively, the kernel generator 150 in the neural processing unit 100 of FIG. 6A may store the base kernel, the kernel filter, and the mapping information which are fetched into the NPU internal memory 120. Once the base kernel, the kernel filter, and the mapping information are stored in the internal memory 120, the neural processing unit 100 may not need to access the memory 200 again. As such, by allowing the neural processing unit 100 to access the NPU internal memory 120 instead of accessing the memory 200, the power consumption may be saved up to 128 times.

In step S2103, the kernel generator 300 of FIG. 5A generates a restored (or modulated) kernel based on the mapping information, the base kernel, and the kernel filter, and then transmits it to the neural processing unit 100. Alternatively, the kernel generator 150 in the neural processing unit 100 of FIG. 6A generates a restored (or modulated) kernel based on the mapping information, the base kernel, and a kernel filter. Alternatively, the kernel generator 240 in the memory 200 of FIG. 6B generates a restored (or modulated) kernel and then transmits it to the neural processing unit 100. Through the operations, the original kernel may be restored or a kernel similar to the original kernel may be generated.

At least one base kernel may be used to restore the kernel. The base kernel is not necessarily a kernel of the first layer, and a kernel of an arbitrary layer or a kernel of an arbitrary channel may be determined as the base kernel.

In other words, the restoration (modulation) kernel may be generated based on at least one of a base kernel and a kernel filter. For example, when the kernel filter is expressed as a coefficient function for the base kernel, the restored (or modulated) kernel may be generated by applying the coefficient to the base kernel. As a more specific example, the coefficient function may be to add or multiply a constant value (e.g., 2) with respect to all elements of the base kernel.

In an example, there may be a case where input data consists of only three channels of RGB as well as a case where dozens or more channels are used. The kernel generator 150, 300, or 240 may generate several original kernels (i.e., a modulated kernel or a restored kernel) according to various techniques based on several base kernels for each channel.

Furthermore, various techniques for generating another kernel using the base kernel may be applied differently for each layer or for each channel. Specifically, the method for generating the kernel may include one of a first method of using the base kernel as it is for other layers or channels, a second method of transforming the base kernel itself, and the like.

In particular, the second method, that is, the method of modifying the base kernel itself, can be implemented through a method of modifying the order of retrieving data from memory. The stored data in the memory may be represented by an address indicating its location. For example, a location may be represented by a column address and a row address in the memory. The convolutional neural network may change the order of receiving each data value of the base kernel by transmitting the modified address to the memory according to the kernel generation algorithm (or the kernel restoration algorithm).

For example, a kernel generation algorithm (or a kernel restoration algorithm) may be instructed that uses the base kernel as it is for the first layer, and rotate the base kernel for generating the weights corresponding to the second to fourth layers, and transpose the base kernel for generating the weight corresponding to the fifth layer.

Conventionally, there was inefficiency in that the entire kernel had to be loaded from memory every time an operation was performed on each layer or channel. However, according to the disclosure of the present specification, it is possible to generate a base kernel and a restored kernel (or a modulated kernel) in real time. Accordingly, it is possible to reduce the frequency of access to the memory 200, thereby remarkably reducing power consumption.

In step S2105, the neural processing unit 100 performs matrix multiplication, convolution, or polling using the base kernel.

In step S2107, the neural processing unit 100 performs matrix multiplication, convolution, or polling using a restoration (modulation) kernel.

In step S2109, the neural processing unit 100 may perform an artificial neural network operation by using the output of the matrix product or convolution.

Figure 22:
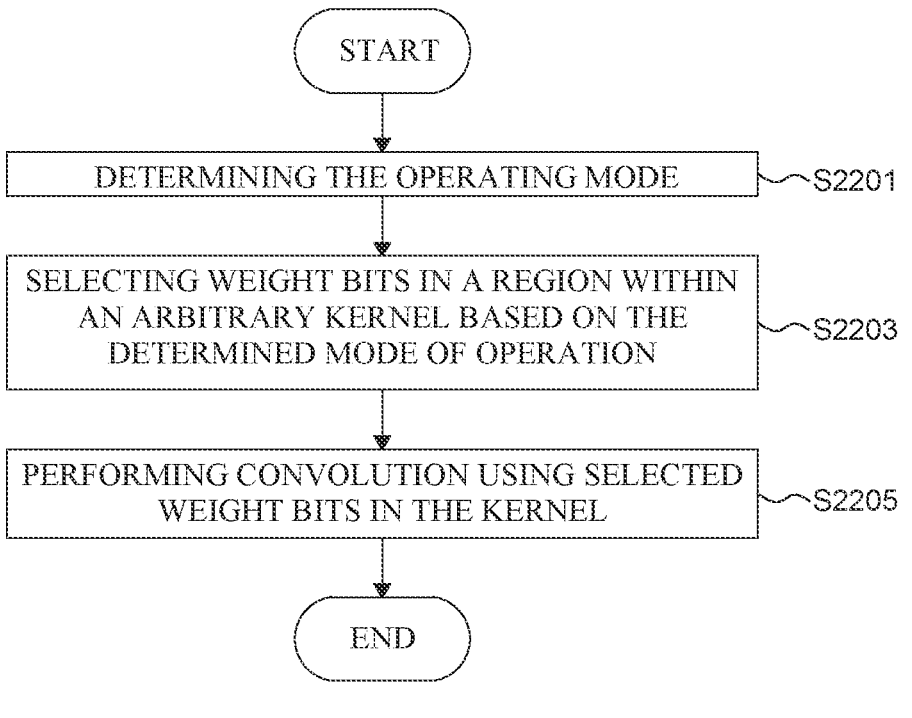
FIG. 22 is an exemplary flowchart of operations of the neural processing unit of FIG. 1 or FIG. 3.

FIG. 22 illustrates operations according to mode of the neural processing unit of FIG. 1 or FIG. 3, and FIGS. 23A and 23B show the active bits of the kernel for each mode.

In step S2201, the neural processing unit 100 may determine its operation mode. The determination may be performed based on preset control information or a control signal. For example, when the neural processing unit 100 receives a control signal to operate in an arbitrary operation mode from the outside, the neural processing unit 100 may determine the operation mode based on the corresponding control signal.

The operation mode may include a plurality of operation modes.

Mode 1 may be a maximum performance operation mode, and mode 2 may be a low power operation mode or a low performance operation mode.

The mode 1 may be for implementing a high-complexity artificial neural network model without considering power consumption. Alternatively, the mode 1 may be for processing high-complexity input data through an artificial neural network model. The mode 1 may be to perform convolution or polling using all bits of the kernel or kernel filter.

The mode 2 may be for considering power consumption or for implementing a low-complexity artificial neural network model. Alternatively, the mode 2 may be for processing low-complexity input data through an artificial neural network model.

Convolution or polling may be performed using only some bits of the kernel or kernel filter. To this end, the kernel or the kernel filter may be divided into a plurality of regions. The mode 2 may be divided into several sub-modes 2-1, 2-2, and 2-3.

In step S2203, the neural processing unit 100 may select a weight bit in an arbitrary kernel region based on the determined operation mode.

As shown in FIG. 23A, the first kernel has a size of a 4×4 matrix, and the bit width of each element is illustrated as 8 bits. Mode 1 may exemplarily select and use all 8-bit elements.

As shown in FIG. 23B, mode 2-1 may use bits of an arbitrary area among weight bits. As shown, mode 2-1 may use 4 bits in the first area among a total of 8 bits. The mode 2-2 may be to use 4 bits in the second area out of a total of 8 bits.

The mode 2-3 may use only some bits of arbitrary elements in, for example, a 4×4 matrix. According to this mode 2-3, for example, a matrix having a size of 3×3 in which each element has a size of 4 bits may be selected and used.

In step S2205, the neural processing unit 100 may perform convolution by using the weight bits selected in the arbitrary kernel.

The examples illustrated in the specification and the drawings are merely provided to facilitate the description of the subject matter of the present disclosure and to provide specific examples to aid the understanding of the present disclosure and it is not intended to limit the scope of the present disclosure. It is apparent to those of ordinary skill in the art to which the present disclosure pertains in which other modifications based on the technical spirit of the present disclosure can be implemented in addition to the examples disclosed herein.

[National R&D Project Supporting this Invention]

[Task Identification Number] 1711152858

49

[Task Number] 2020-0-01297-003
[Name of Ministry] Ministry of Science and ICT
[Name of Project Management (Specialized) Institution] Institute of Information & Communications Technology Planning & Evaluation
[Research Project Title] Next-generation Intelligent Semiconductor Technology Development (Design)
[Research Task Title] Technology Development of a Deep Learning Processor Advanced to Reuse Data for Ultra-low Power Edge
[Contribution Rate] 1/1
[Name of Organization Performing the Task] DeepX Co., Ltd.
[Research Period] 2022.01.01~2022.12.31

What is claimed is:

1. A semiconductor device for processing an operation of an artificial neural network (ANN) model, comprising:
a first circuitry for at least one memory configurable to store one or more first coefficients; and
a second circuitry configured to generate a plurality of feature maps including a first feature map and a second feature map,
wherein the first feature map is generated based on the one or more first coefficients in a first kernel filter,
wherein the first kernel filter is generated based on a difference between a first kernel and a second kernel, and
wherein the first kernel includes one or more first weights.

2. The semiconductor device of claim 1, wherein the second feature map is generated based on one or more second coefficients.

3. The semiconductor device of claim 2, wherein the generation of the second feature map is further based on one or more second weights.

4. The semiconductor device of claim 1, wherein the generation of the first feature map is further based on the one or more first weights.

5. The semiconductor device of claim 4,
wherein the one or more first weights in the first kernel are expressed in form of a K×M matrix, K and M being integers, and
wherein the first kernel is applicable to a first layer of the ANN model.

6. The semiconductor device of claim 4, wherein the second circuitry is further configured to generate a first updated kernel, based on the one or more first weights and the one or more first coefficients.

7. The semiconductor device of claim 4, wherein the second circuitry is further configured to generate a first updated kernel, based on the first kernel and the first kernel filter.

8. The semiconductor device of claim 7, wherein the second circuitry is further configured to generate a second modulation kernel based on the first kernel and a second kernel filter.

9. The semiconductor device of claim 8,
wherein the second kernel filter is set to be generated by applying a mathematical function to the first kernel filter, and
wherein the mathematical function comprises at least one of a delta function, a rotation function, a transpose function, a bias function, or a global weight function.

10. The semiconductor device of claim 9, wherein the second circuitry is configured to generate a third modulation kernel based on one among the first kernel, the first kernel filter, the mathematical function applied to the first kernel or the first kernel filter, a coefficient applied to the first kernel or the first kernel filter, and an offset applied to the first kernel or the first kernel filter.

11. The semiconductor device of claim 1, wherein the one or more first coefficients are set during a training process of the ANN model.

12. The semiconductor device of claim 1, wherein the at least one memory is further configurable to store mapping information between at least one kernel and at least one kernel filter for generating at least one updated kernel.

13. An apparatus including:
a semiconductor substrate on which an electrically conductive pattern is formed;
at least one first memory electrically connected to the semiconductor substrate and configurable to store one or more first coefficients; and
at least one neural processing unit (NPU) electrically connected to the semiconductor substrate and configurable to access the at least one first memory, the NPU comprising
a first circuitry for at least one internal memory configurable to cache at least one feature map of a plurality of feature maps, and
a second circuitry configured to generate a plurality of feature maps including a first feature map and the second feature map,
wherein the first feature map is generated based on the one or more first coefficients in a first kernel filter,
wherein the first kernel filter is generated based on a difference between a first kernel and a second kernel, and
wherein the first kernel includes one or more first weights.

14. The apparatus of claim 13, wherein the second feature map is generated based on one or more second coefficients.

15. The apparatus of claim 14, wherein the generation of the second feature map is further based on one or more second weights.

16. The apparatus of claim 13, wherein the generation of the first feature map is further based on one or more first weights.

17. A method for operating an artificial neural network (ANN) model, comprising:
receiving a first image input;
generating a first feature map based on the first image input; and
generating a second feature map based on the first feature map,
wherein the generation of the first feature map is further based on one or more first coefficients in a first kernel filter,
wherein the first kernel filter is generated based on a difference between a first kernel and a second kernel, and
wherein the first kernel includes one or more first weights.

18. The method of claim 17, wherein the generation of the second feature map is further based on one or more second coefficients.

19. The method of claim 18, wherein the generation of the second feature map is further based on one or more second weights.

* * * * *